United States Patent
Ginetti et al.

(10) Patent No.: US 9,779,193 B1
(45) Date of Patent: Oct. 3, 2017

(54) METHODS, SYSTEMS, AND COMPUTER PROGRAM PRODUCT FOR IMPLEMENTING ELECTRONIC DESIGN LAYOUTS WITH SYMBOLIC REPRESENTATIONS

(71) Applicant: Cadence Design Systems, Inc., San Jose, CA (US)

(72) Inventors: Arnold Ginetti, Antibes (FR); Yuan-Kai Pei, Taipei (TW); Yu-Chi Su, Hsinchu (TW)

(73) Assignee: Cadence Design Systems, Inc., San Jose, CA (US)

( * ) Notice: Subject to any disclaimer, the term of this patent is extended or adjusted under 35 U.S.C. 154(b) by 253 days.

(21) Appl. No.: 14/675,665

(22) Filed: Mar. 31, 2015

(51) Int. Cl.
*G06F 17/50* (2006.01)

(52) U.S. Cl.
CPC ...... *G06F 17/5045* (2013.01); *G06F 17/5068* (2013.01); *G06F 17/5081* (2013.01); *G06F 2217/74* (2013.01)

(58) Field of Classification Search
None
See application file for complete search history.

(56) References Cited

U.S. PATENT DOCUMENTS

| | | | |
|---|---|---|---|
| 6,026,220 A * | 2/2000 | Cleereman | G06F 17/5045 703/23 |
| 6,230,305 B1 * | 5/2001 | Meares | G06F 17/50 716/102 |
| 6,256,768 B1 * | 7/2001 | Igusa | G06F 17/5068 716/124 |
| 6,378,116 B1 | 4/2002 | Ginetti | |
| 6,405,345 B1 | 6/2002 | Ginetti | |
| 6,470,482 B1 * | 10/2002 | Rostoker | G01R 31/31704 714/E11.167 |
| 6,519,743 B1 | 2/2003 | Nauts et al. | |
| 6,622,290 B1 | 9/2003 | Ginetti et al. | |
| 6,622,291 B1 | 9/2003 | Ginetti | |
| 7,350,160 B2 * | 3/2008 | Perez | G06F 17/5068 716/119 |
| 7,418,683 B1 * | 8/2008 | Sonnard | G06F 17/5081 716/122 |
| 7,418,686 B1 * | 8/2008 | Knol | G06F 17/5072 716/118 |
| 7,546,232 B2 * | 6/2009 | Brooks | G05B 19/409 700/83 |

(Continued)

*Primary Examiner* — Leigh Garbowski
(74) *Attorney, Agent, or Firm* — Vista IP Law Group, LLP

(57) ABSTRACT

Disclosed are techniques for implementing electronic design layouts with symbolic representations. These techniques determine an abstraction scope of a layout circuit component in a layout of an electronic design by referencing a user input or one or more default settings of the abstraction mechanism and identify first data that are included in or associated with a schematic symbol for the layout circuit component by traversing data from a symbolic representation data source with reference to the abstraction scope with the layout editing mechanism. In addition, these techniques further generate a symbolic representation for the layout circuit component by reproducing at least some of the first data in the layout and perform one or more layout operations on the symbolic representation to improve the layout and to generate a result set for the one or more layout operations.

20 Claims, 18 Drawing Sheets

(56) References Cited

U.S. PATENT DOCUMENTS

| | | |
|---|---|---|
| 7,555,739 B1 | 6/2009 | Ginetti et al. |
| 7,634,743 B1 | 12/2009 | Ginetti |
| 7,735,036 B2 * | 6/2010 | Dennison ............ G06F 17/5045 716/106 |
| 7,865,857 B1 * | 1/2011 | Chopra ............... G06F 17/5045 716/119 |
| 7,949,987 B1 | 5/2011 | Ginetti et al. |
| 7,971,175 B2 | 6/2011 | Ginetti et al. |
| 7,971,178 B1 | 6/2011 | Marwah et al. |
| 8,028,243 B1 * | 9/2011 | O'Riordan ............ G06F 9/4443 715/762 |
| 8,046,730 B1 | 10/2011 | Ferguson et al. |
| 8,181,137 B2 * | 5/2012 | Uppaluri ............. G06F 17/5022 716/111 |
| 8,255,845 B2 | 8/2012 | Ginetti |
| 8,281,272 B1 | 10/2012 | Ginetti |
| 8,347,261 B2 | 1/2013 | Ginetti et al. |
| 8,364,656 B2 | 1/2013 | Arora et al. |
| 8,397,194 B2 * | 3/2013 | Uppaluri ............. G06F 17/5022 716/107 |
| 8,434,051 B2 * | 4/2013 | Koyuncu ............ G06F 17/5045 716/100 |
| 8,453,136 B1 | 5/2013 | Hahn et al. |
| 8,490,038 B1 | 7/2013 | Arora et al. |
| 8,527,934 B2 | 9/2013 | Ginetti et al. |
| 8,594,988 B1 | 11/2013 | Spyrou et al. |
| 8,631,376 B2 * | 1/2014 | Werner ............... G06F 17/5072 716/118 |
| 8,640,078 B2 * | 1/2014 | Majumder ............ G06F 17/30 716/100 |
| 8,640,079 B2 * | 1/2014 | Majumder ............ G06F 17/50 716/100 |
| 8,677,260 B1 * | 3/2014 | O'Riordan ........... G06F 9/4443 715/762 |
| 8,689,121 B2 * | 4/2014 | O'Riordan ................ G06F 8/34 715/205 |
| 8,707,226 B2 | 4/2014 | Lu et al. |
| 8,719,754 B1 | 5/2014 | Ginetti |
| 8,732,636 B2 | 5/2014 | Ginetti et al. |
| 8,762,906 B2 | 6/2014 | Ginetti et al. |
| 8,806,405 B2 | 8/2014 | Colwell et al. |
| 8,837,294 B2 * | 9/2014 | Frishberg ............ H04L 43/045 370/241 |
| 8,898,039 B1 * | 11/2014 | Kukal ................ G06F 17/5045 703/1 |
| 8,910,100 B1 | 12/2014 | Wilson et al. |
| 9,092,586 B1 | 7/2015 | Ginetti et al. |
| 9,129,081 B2 | 9/2015 | Ginetti et al. |
| 9,141,746 B1 | 9/2015 | Ginetti et al. |
| 9,182,948 B1 * | 11/2015 | O'Riordan ......... G05B 19/0426 |
| 9,208,137 B2 | 12/2015 | Ginetti |
| 9,223,915 B1 | 12/2015 | Ginetti et al. |
| 9,280,621 B1 | 3/2016 | Ginetti et al. |
| 9,286,430 B1 * | 3/2016 | Ho ..................... G06F 17/5081 |
| 9,304,981 B1 * | 4/2016 | Patidar ................. G06F 17/241 |
| 9,348,960 B1 | 5/2016 | Ginetti et al. |
| 9,361,415 B1 | 6/2016 | Ginetti et al. |
| 9,390,218 B2 * | 7/2016 | Lee ..................... G06F 17/5081 |
| 9,411,925 B2 * | 8/2016 | Meng ................. G06F 17/5081 |
| 9,557,989 B2 * | 1/2017 | Dobinson ................ G06F 8/71 |
| 2011/0016423 A1 * | 1/2011 | Brubaker ............. G06F 3/0481 715/800 |

* cited by examiner

402 IDENTIFY THE LAYOUT CIRCUIT COMPONENT INTO A FUNCTIONAL GROUP OF LAYOUT CIRCUIT COMPONENTS

404 GENERATE A $1^{ST}$ SYMBOLIC REPRESENTATION FOR THE FUNCTIONAL GROUP BASED ON THE LAYOUT DESIGN DATA OF THE LAYOUT CIRCUIT COMPONENTS IN THE FUNCTIONAL GROUP

406 IDENTIFY M-FACTORED LAYOUT CIRCUIT COMPONENTS

408 GENERATE $1^{ST}$ BOUNDING BOXES FOR $1^{ST}$ INSTANCES OF THE SAME $1^{ST}$ LAYOUT CIRCUIT COMPONENT IN THE M-FACTORED LAYOUT CIRCUIT COMPONENTS WITH IDENTICAL $1^{ST}$ GRAPHICAL AND / OR TEXTUAL EMPHASIS

410 OPTIONALLY GENERATE $2^{ND}$ BOUNDING BOXES FOR $2^{ND}$ INSTANCES OF THE SAME $2^{ND}$ LAYOUT CIRCUIT COMPONENT IN THE M-FACTORED LAYOUT CIRCUIT COMPONENT WITH IDENTICAL $2^{ND}$ GRAPHICAL AND / OR TEXTUAL EMPHASIS

412 IDENTIFY A MATCH PATTERN FOR THE M-FACTORED LAYOUT CIRCUIT COMPONENTS BY USING GRAPHICAL AND / OR TEXTUAL EMPHASIS OF THE $1^{ST}$ & $2^{ND}$ BOUNDING BOXES

414 GENERATE $3^{RD}$ BOUNDING BOXES FOR DUMMY CIRCUIT COMPONENTS WITH IDENTICAL $3^{RD}$ GRAPHICAL AND / OR TEXTUAL EMPHASIS

416 UPDATE THE $1^{ST}$ SYMBOLIC REPRESENTATION IN THE LAYOUT USING THE $1^{ST}$ BOUNDING BOXES, THE $2^{ND}$ BOUNDING BOXES, AND OPTIONALLY WITH THE $3^{RD}$ BOUNDING BOXES

FIG. 4

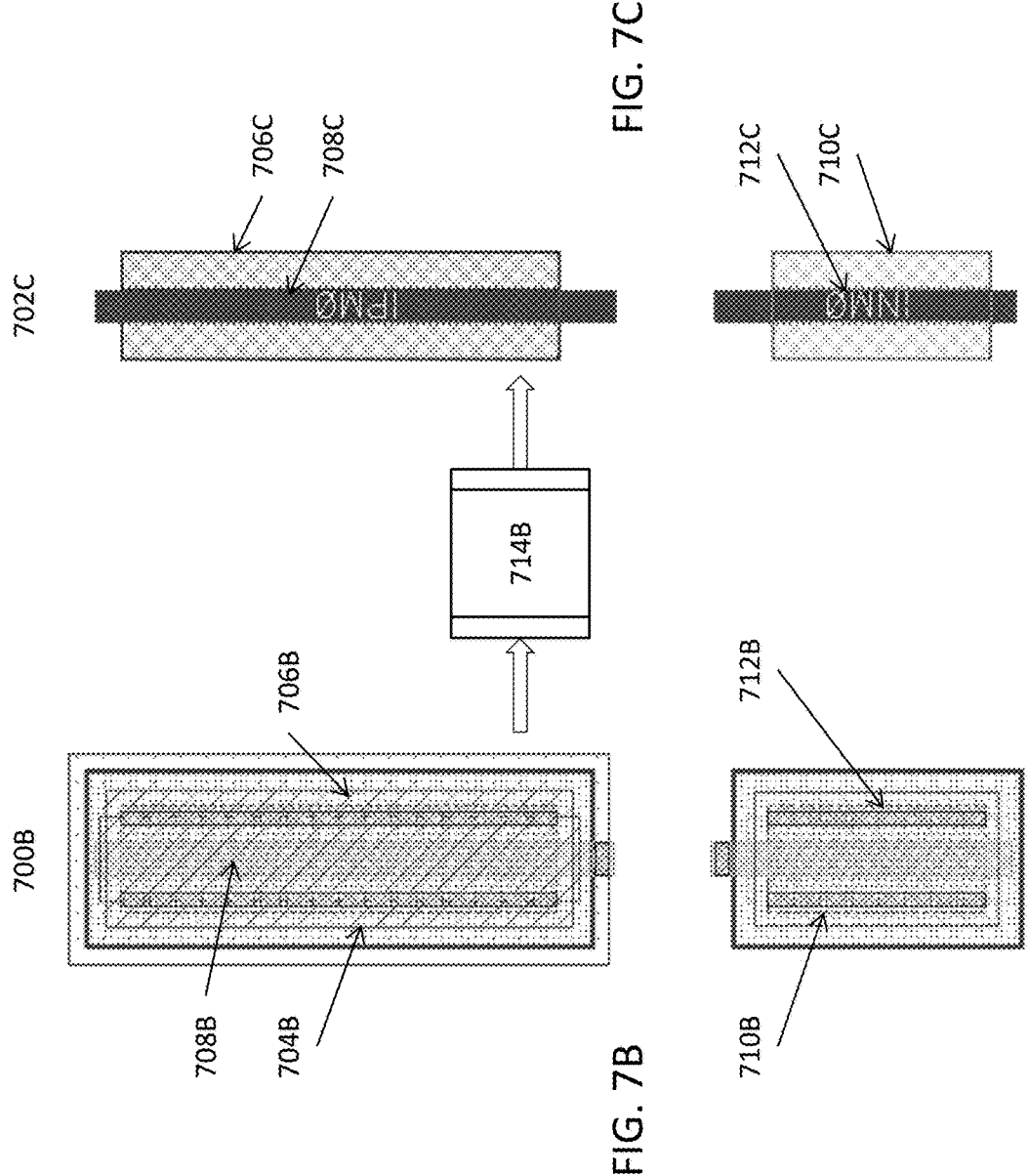

METHODS, SYSTEMS, AND COMPUTER PROGRAM PRODUCT FOR IMPLEMENTING ELECTRONIC DESIGN LAYOUTS WITH SYMBOLIC REPRESENTATIONS

BACKGROUND

In custom IC design, the schematic topology is composed of transistors, capacitors, resistors, inductors, macro blocks, wires, and etc. For the mask layout implementation, the layout designer creates these circuit components with mask layout devices in the layout design canvas. Generally, it is required to manipulate the placement of layout devices to optimize the mask layout design. Nonetheless, it may be difficult and time-consuming to manipulate the mask layout design when it is complicated and contains plenty of shapes with little on-canvas information to guide the placement and routing.

Some conventional approaches utilize a middleware or an intermediate module (e.g., a match device creator, a stick diagram compiler, etc.) that interposes between a schematic design and a layout of an electronic design. The middleware or intermediate module (collectively middleware hereinafter) presents a symbolic representation of an electronic design or a portion thereof that includes symbols of various electronic design elements for the ease of viewing, editing, debugging, etc. This symbolic representation, originally mapped from schematic, can be converted into mask layout, or translated from mask layout (collectively mapping hereinafter), to replace the need for directly editing complicated mask layout, however, in a lossy manner.

Such mappings are lossy in the sense that these mappings generalize and simplify the design elements (e.g., layout structures) by generating symbolic representations or symbols for electronic design elements and thus do not preserve all the design details of such electronic design elements. For example, the layout design elements in advanced process nodes have more shapes and complicated behaviors than those in mature process nodes, and these elements will vary foundry by foundry, which cannot possibly be fully captured by the same symbolic representation. That means certain types of editing are only allowed in the mask layout but not supported by the middleware, and these edits, if made, will be lost during mapping. When that happens, the middleware needs to be specially customized per process node in order to make it useful again, which incurs substantial support and maintenance efforts.

Therefore, there exists a need for a method, system, and computer program product for generating symbolic representation and information for a physical electronic design.

SUMMARY

Disclosed are method(s), system(s), and article(s) of manufacture for implementing electronic design layouts with symbolic representations in various embodiments. Some first embodiments are directed at a method for implementing electronic design layouts with symbolic representations.

In these first embodiments, the method may include the act of determining, at an abstraction mechanism coupled with at least one micro-processor of a computing system, an abstraction scope of a layout circuit component in a layout of an electronic design by referencing a user input or one or more default settings of the abstraction mechanism and the act of identifying, at a cellview content identification mechanism coupled with a layout editing mechanism and the abstraction mechanism, first data that are included in or associated with a schematic symbol for the layout circuit component by traversing the schematic symbol with reference to the abstraction scope with the layout editing mechanism. In addition, the method may further include the act of generating, at a symbolic representation generation mechanism coupled to the layout editing mechanism, a symbolic representation for the layout circuit component by reproducing at least some of the first data in the layout and the act of performing one or more layout operations on the symbolic representation to improve the layout and to generate a result set for the one or more layout operations.

In some of these first embodiments, the act of generating the symbolic representation may further include the act of reproducing the at least some of the first data in the layout with one or more native functions of the layout editing mechanism based in part or in whole upon design data of the layout circuit component, wherein the symbolic representation is generated without using a separate processing module in addition to the layout editing mechanism. In addition or in the alternative, the act of identifying the first data may include the act of determining, at the layout editing mechanism, physical design data of the layout circuit component form the layout based in part or in whole upon the abstraction scope and the act of identifying, at the layout editing mechanism coupled with a schematic editing mechanism, a schematic symbol for the layout circuit component by retrieving a connection of or associated with the layout circuit component from at least layout connectivity information and determining the schematic symbol via identification binding between the layout connectivity information and schematic connectivity information.

In some of the immediately preceding embodiments, the act of identifying the first data may include the act of identifying, at a schematic symbol content identification mechanism coupled to the layout editing mechanism, schematic symbol content that falls within the abstraction scope as the first data, the act of identifying, at the schematic symbol content identification mechanism coupled with the layout editing mechanism, one or more other symbolic representations and/or one or more layout circuit components connected to the layout circuit component from a surrounding environment of the layout circuit symbol by using the schematic symbol content identification mechanism or the layout editing mechanism to traverse the layout based in part or in whole upon the layout connectivity information, and the act of identifying, at the schematic symbol content identification mechanism coupled with the layout editing mechanism, data included in or associated with the one or more other symbolic representations and/or the one or more layout circuit components into the first data.

In some of the first embodiments, the act of generating the symbolic representation the act of identifying, at the schematic symbol content identification mechanism coupled with the layout editing mechanism, a plurality of sub-components of the layout circuit component by examining layout design data of the layout circuit component, the act of generating, at the symbolic representation generation mechanism coupled to the schematic symbol content identification mechanism, one or more additional symbolic representations for the plurality of sub-components by reproducing the plurality of sub-components based in part or in whole upon the abstraction scope, and the act of updating, at the symbolic representation generation mechanism, the symbolic representation of the layout circuit component by including the one or more additional symbolic representations for the plurality of sub-components in the symbolic representation.

In some of the immediately preceding embodiments, the act of generating the one or more additional symbolic representations for the plurality of sub-components may comprise the act of identifying, at the schematic symbol content identification mechanism coupled with the layout editing mechanism, one or more common boundary segments between the plurality of sub-components of the layout circuit component by examining the layout design data of the plurality of sub-components and the act of eliminating a graphical representation of the one or more common boundary segments in the one or more additional symbolic representations.

In some of the first embodiments, the layout is represented with the symbolic representation in a user interface window, and the symbolic representation is represented in place of or at least partially in addition to the layout circuit component, and the symbolic representation is inserted into the layout with an orientation based in part or in whole upon electrical design data and/or a size determined based in part or in whole upon physical design data of the layout circuit component.

In addition or in the alternative, the method may further comprise the act of identifying, at the schematic symbol content identification mechanism coupled to the symbolic representation generation mechanism, the layout circuit component into a functional group including a plurality of layout circuit components by examining the functional group to determine whether the functional group jointly performs a circuit function and the act of generating, at the symbolic representation generation mechanism, a first symbolic representation for the functional group based in part or in whole upon physical and/or electrical design data of the functional group, wherein the first symbolic representation includes a first schematic symbol of the functional group but not the schematic symbol of the layout circuit design component.

The method in some of the first embodiments may further comprise the act of identifying, at the schematic symbol content identification mechanism coupled to the symbolic representation generation mechanism, m-factored layout circuit components and the act of generating, at the symbolic representation generation mechanism, one or more first bounding boxes for one or more first instances of a first layout circuit component in the m-factored layout circuit components by reproducing the one or more first bounding boxes with the symbolic representation generation mechanism with a first graphical and/or textual emphasis.

In some of these embodiments, the method may further generate, at the symbolic representation generation mechanism, one or more second bounding boxes for one or more second instances of a second layout circuit component in the m-factored layout circuit components by reproducing the one or more second bounding boxes with the symbolic representation generation mechanism with a second graphical and/or textual emphasis, identify, at the symbolic representation generation mechanism, a match pattern for the m-factored layout circuit components by identifying and comparing the first graphical and/or textual emphasis with the second graphical and/or textual emphasis, and generate, at the symbolic representation generation mechanism, a visual aid for the match pattern to a user with the first graphical and/or textual emphasis with the second graphical and/or textual emphasis.

The method may further generate, at the symbolic representation generation mechanism, one or more third bounding boxes for one or more third instances of a third layout circuit component in the m-factored layout circuit components by reproducing the one or more third bounding boxes with the symbolic representation generation mechanism with a third graphical and/or textual emphasis, wherein the one or more third instances comprise one or more dummy circuit components, and update, at the symbolic representation generation mechanism, the symbolic representation by referencing the one or more first bounding boxes, the one or more second boxes, or the one or more third bounding boxes in some of the immediately preceding embodiments.

The method may also include the act of identifying, at the layout editing mechanism, a layout portion of the layout including one or more symbolic representations of one or more layout circuit components, and the act of partitioning, at a classification and partitioning mechanism coupled with the layout editing mechanism, the one or more symbolic representations in the layout portion by analyzing the layout portion based in part or in whole upon connectivity information and by grouping the one or more symbolic representations into multiple groups in some of the first embodiments.

In addition, the method may further include the act of identifying, at the layout editing mechanism coupled with a schematic editing mechanism, one or more nets connecting the multiple groups or connecting at least a part of the multiple groups to a surrounding environment based in part or in whole upon the connectivity information or identification binding, and the act of identifying, at the layout editing mechanism coupled with the schematic editing mechanism, one or more sources and one or more destinations for the one or more nets by examining the connectivity information related to the one or more nets in some of the immediately preceding embodiments.

In addition, the method may further include the act of identifying, at the symbolic representation generation mechanism coupled with the layout editing mechanism, one or more flight-lines connecting at least some of the multiple groups or at least a part of the multiple groups to a surrounding environment by invoking a topological routing mechanism to determine the one or more flight-lines based in part or in whole upon the one or more sources and one or more destinations, the act of associating, at the symbolic representation generation mechanism, interconnection information with the one or more flight-lines, and the act of updating the one or more symbolic representations with the one or more flight-lines and/or the interconnection information in some of the immediately preceding embodiments.

Some embodiments are directed at one or more hardware mechanisms that include and/or function in conjunction with at least one micro-processor as well as other related components or architectures of one or more computing systems and may be invoked to perform any of the methods, processes, or sub-processes disclosed herein. The hardware system may include one or more variants of a schematic editing mechanism, a layout editing mechanism, an abstraction mechanism, a cellview content identification mechanism, a symbolic representation generation mechanism, a connectivity identification mechanism, a classification and partitioning mechanism, and/or a flight-line generation mechanism in some embodiments.

Each of these mechanisms may include or function in tandem with electrical circuitry and one or more microprocessors each having one or more processor cores to perform their intended functions. The hardware system may further include one or more forms of non-transitory machine-readable storage media or persistent storage devices to temporarily or persistently store various types of data or information, various rulers, various rules, various libraries, selected and selectable targets, or any other suitable information or data, etc. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing three-dimensional operations for electronic designs are described below with reference to FIGS. 1-6 and 7A-L.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 4 illustrates a more detailed block diagram for implementing electronic design layouts with symbolic representations in one or more embodiments.

FIGS. 7A-L respectively illustrate working examples of the application of some techniques described herein to various simplified electronic design layout portions in one or more embodiments.

DETAILED DESCRIPTION

Figure 1:
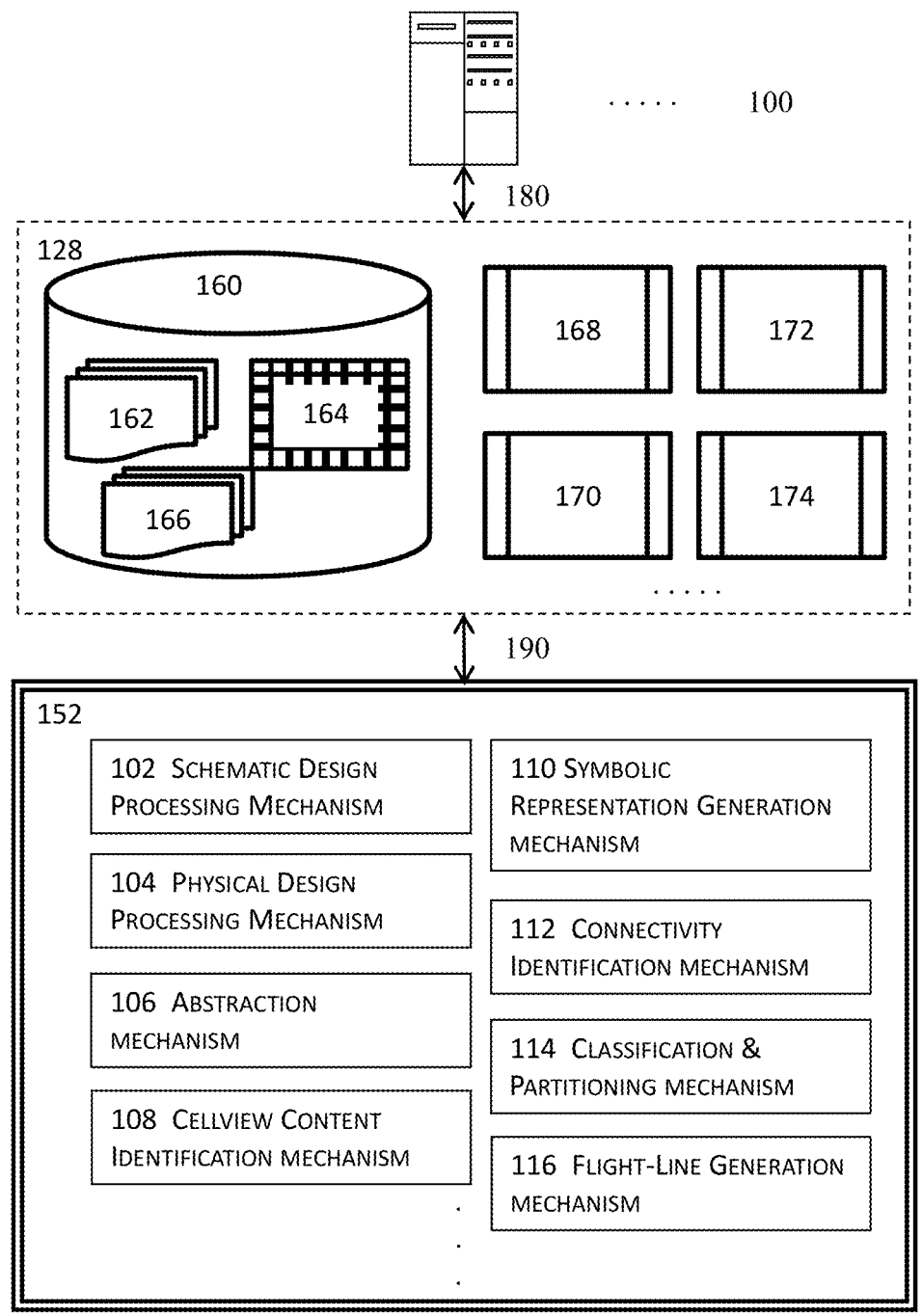
FIG. 1 illustrates a high level block diagrams for an electronic design automation system for implementing electronic design layouts with symbolic representations in one or more embodiments.

Various embodiments are directed to a method, system, and computer program product for implementing electronic design layouts with symbolic representations. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-6 and 7A-L.

In one or more embodiments, various techniques described herein first identify or determine an abstraction scope for generating a symbolic representation of a layout circuit component. These techniques identify various pieces of data that are included in the schematic symbol corresponding to the layout circuit component by traversing the schematic symbol based in part or in whole upon the abstraction scope and connectivity information. In some embodiments, identification binding between the schematic domain and the physical domain may also be utilized to identify these various pieces of data. These techniques may further identify other pieces of data that are associated with the schematic symbol.

With these pieces of data identified, these techniques may generate a symbolic representation for the layout circuit component. These techniques generate the symbolic representation in the layout by using one or more native functions of a layout editor (e.g., a layout editing mechanism) without using a separate processing module. The symbolic representation may be represented in place of or in addition to the layout circuit component in the layout. In some embodiments, the symbolic representation is overlaid atop the layout circuit component. The symbolic representation may further be updated with additional information, data, or representations. A symbolic representation appears to be graphically less complex than the layout circuit component for which the symbolic representation is generated but preserves the design data of the layout circuit component.

FIG. 1 illustrates a high level schematic block diagrams for an electronic design automation system for implementing electronic design layouts with symbolic representations in one or more embodiments. In one or more embodiments, the system illustrated in FIG. 1 may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also include, invoke, or function in conjunction with, via one or more computing networks and/or one or more bus architectures 180, one or more various resources or mechanisms 128 that may comprise a global routing mechanism, a switchbox routing mechanism, a channel routing mechanism, and/or a detail routing mechanism 168, a layout editor 170, a design rule checker 172, one or more verification mechanisms 174, etc.

The one or more computing systems 100 may further write to and read from, via one or more computing networks and/or one or more bus architectures 190, a local or remote volatile or non-volatile computer accessible storage 160 that stores thereupon data or information such as, but not limited to, one or more files and/or databases (164) such as one or more physical design databases, one or more schematic design databases, a schematic symbol cellview database, various data, rule decks, constraints, one or more views or representations of the physical design databases, etc. (162), or other information or data (166) that may be used to facilitate the performance of various functions to achieve the intended purposes.

In some embodiments, the one or more computing systems 100 may, either directly or indirectly through various resources or mechanisms 128 to invoke various software, hardware modules, or combinations thereof 152 that may comprises schematic design processing mechanism 102 to access, edit, traverse, extract, annotate, stitch or assemble multiple sub-schematic designs, or otherwise manipulate schematic designs or information associated therewith. For example, the schematic design processing mechanism 102 may include a schematic editing tool, a schematic simulation tool, a schematic extraction tool, etc.

The resources or mechanisms 128 may further comprise a physical design processing mechanism 104 to access, edit, traverse, extract, annotate, stitch or assemble multiple physical designs (e.g., layouts), or otherwise manipulate physical designs or information associated therewith, and an abstraction mechanism 106 to identify or determine abstraction scopes or to function in tandem with one or more other mechanisms to enforce abstraction scopes. In addition, the resources or mechanisms 128 may include a cellview content identification mechanism 108 to identify the content of a cellview (e.g., a schematic symbol cellview) and/or information or data associated with or included in one or more surrounding circuit component designs of a schematic cellview and/or its corresponding layout circuit components of an electronic design of interest.

Moreover, the resources and mechanisms 128 may comprise a symbolic representation generation mechanism 110 to generate symbolic representations and a connectivity identification mechanism 112 to identify connectivity information. Connectivity information may include, for example, nets, pins, ports, instances, devices, circuit component designs, identifications thereof, or any information related to how circuit component designs are connected in some embodiments.

The resources and mechanism 128 may also include a classification and partitioning mechanism 114 to identify a plurality of circuit component designs, classify the plurality of circuit component designs into multiple classes, and partition the plurality of circuit component designs into multiple groups according to their classes. In some embodiments, the resources and mechanisms 128 may further include a flight-line generation mechanism 116 that invokes native functions of the schematic and/or physical design processing mechanisms (102 and/or 104) to generate flight-lines in schematic or physical designs. More details about these mechanisms will be described below with reference to FIGS. 2-5 and 7A-B.

Figure 2:
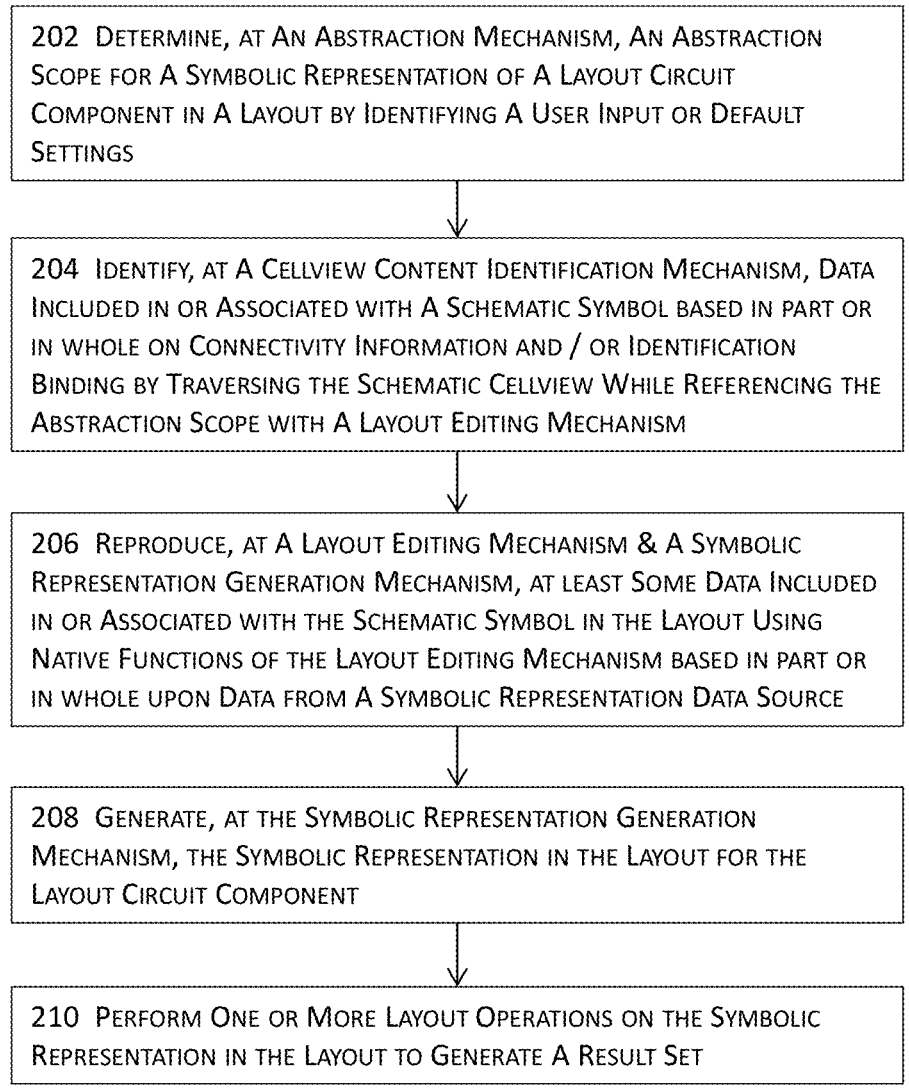
FIG. 2 illustrates a high-level block diagram for implementing electronic design layouts with symbolic representations in one or more embodiments.

FIG. 2 illustrates a high-level block diagram for implementing electronic design layouts with symbolic representations in one or more embodiments. In these embodiments, at 202, an abstraction scope may be determined with an abstraction mechanism (e.g., the abstraction mechanism 106 of FIG. 1) that includes or functions in tandem with at least one microprocessor having one or more processor cores as well as the electrical circuitry supporting the at least one microprocessor.

An abstraction scope includes an explicit or implicit specification of the extent, range, type, and/or constituents of layout circuit components to be represented in a symbolic representation in some embodiments. For example, a user may specify an area in a layout to be represented as a symbolic representation; a user may specify what types of circuit components (e.g., transistors, resistors, capacitors, inductors, interconnects or traces, macro blocks, various types of cells, various types of instances, intellectual property or IP blocks, or any block of electrical circuitry or components, nets, dummy devices, etc.), which region or area, which layers (e.g., diffusion layers, polysilicon layers, etc.), which functions of interest, and/or how identical circuit components on a layer, etc. are to be represented with one or more symbolic representations in the layout.

The abstraction scope mechanism may determine an abstraction scope, either alone or in conjunction with one or more other mechanisms or users, by receiving one or more criteria including, for example, user's identification or selection of an area or portion in a layout of an electronic design, an entire layout, an entire portion in a display window of a user interface in a layout, or any other user specified, pre-determined, or default criteria.

At 204, a cell view content identification mechanism, either alone or in tandem with one or more other mechanisms, may identify data that are included in or associated with a schematic symbol by traversing the schematic symbol with one or more native functions of a layout editing mechanism based in part or in whole upon the connectivity information and/or identification binding among circuit component design identifications while referencing the abstraction scope. In some embodiments, a function is native to a mechanism when the mechanism may access, understand, and invoke the function and various data or parameters therefor without performing any intermediate compilation, translation, mapping, or transformation with a separate processing module (e.g., a separate symbolic editor often running in a separate user interface window).

In some embodiments, a function is native to a mechanism when the mechanism may access, understand, and invoke the function and various data or parameters therefor without issuing one or more function calls to invoke an intermediate processing module to execute the function within the layout editing mechanism. For example, the layout editing mechanism may reference the connectivity information of a layout, identify a source or destination of traversal, and traverse a net in the layout using the connectivity information at 204.

A schematic symbol may comprise a schematic symbol cellview that may be stored in a non-transitory computer accessible medium (e.g., a data structure or a database). A schematic symbol cellview may include geometric objects (e.g., polygons, line segments, etc.) for the schematic symbol, text (e.g., identification of the schematic symbol cellview), graphic elements (e.g., shading, linetypes, etc.), one or more arguments corresponding to one or more parameters defining the circuit component represented by the schematic symbol, one or more instances (e.g., Vdd, Gnd, Vdc, Vpulse, etc.) and/or properties thereof, or any other types of data or information that is required or desired to represent a circuit component in an electronic design.

A schematic symbol cellview may reference or be associated with one or more library modules which may include one or more pieces of data or information described immediately above. These one or more library modules may aid the generation of the schematic symbol in a schematic design or a layout. In some embodiments, the layout editing mechanism may include native functions to traverse a schematic symbol cellview to identify its content and to recreate at least a part of the schematic symbol in a layout, without performing any intermediate compilation, translation, mapping, or transformation on the schematic symbol cellview or its constituents or on the corresponding layout structures via an intermediate process module or middleware.

At 206, the layout editing mechanism may use its native functions to reproduce (e.g., by drawing, redrawing, pasting, overlaying, stitching, manipulating, etc.) at least some of the data identified at 204 in the layout in conjunction with a symbolic representation generation mechanism. In some embodiments, the data identified for the layout circuit component is reproduced with the native functions of the layout editing mechanism while referencing the physical design data of the layout circuit component. In some embodiments, the data may be identified from a schematic cellview symbol corresponding to the layout circuit component or other data related to the schematic design, the physical design data of the layout circuit component, or both. In addition or in the alternative, the identified data may be obtained from any previously saved electronic records. For example, a corresponding textual, graphical, or both textual and graphical representation may be reproduced by drawing, redrawing, pasting, overlaying, stitching, or otherwise manipulating the content of an electronic record (e.g., a textual file, a data structure, a graphical image, an object in object oriented programming, etc.) with native layout editing functions and affixed to one or more layout circuit components in a layout of an IC design. Therefore, the identified data may be obtained from sources including the physical design data of the layout, the schematic cellview symbols, the schematic design, both schematic and layout design data, or any electronic records. One or more of these sources or any combinations thereof for the identified data of a layout circuit component may be referred to as a symbolic representation data source.

In an example where the layout editing mechanism traverses a schematic symbol cellview of a MOS (metal-oxide-semiconductor), reproduces (e.g., by drawing, redrawing, pasting, etc.) a schematic symbol of the MOS in the layout, and overlays the reproduced MOS schematic symbol with the corresponding MOS layout structures, the layout editing mechanism may identify the size or dimensions and orientation of the MOS layout structure to determine the size and the orientation of the MOS schematic symbol and then reproduce the MOS schematic symbol with the determined size and orientation in the layout. In some of these embodiments, the reproduced schematic symbol and/or the symbolic representation that includes the reproduced schematic symbol may be dynamically scaled with the zooming level of the layout window in the user interface such that the reproduced schematic symbol and/or the symbolic representation exactly or approximately match the actual size of the corresponding layout structures.

At 208, a symbolic representation of the layout circuit component may be generated by the symbolic representation generation mechanism either alone or in conjunction with the functioning of one or more other mechanisms (e.g., the layout editing mechanism, etc.) A symbolic representation may include a simplified representation of the layout circuit component and may further include a modified representation of one or more surrounding circuit components in the vicinity of the layout circuit component in some embodiments. A symbolic representation of a layout circuit component may also include textually and/or graphically reproduced data that are identified from a symbolic representation data source. For example, a symbolic representation of a layout circuit component may include a simplified representation of the layout circuit component, a modified representation of zero or more surrounding layout circuit components, at least a part of a schematic cellview symbol, one or more markers or identifiers (e.g., an end marker, an orientation marker, etc.), and/or a textual, graphical, or both textual and graphical reproduction of at least a portion of an electronic record (e.g., a picture, image, or equivalent circuit of an operational amplifier with or without additional annotations, etc.) related to the layout circuit component. In some embodiments, a symbolic representation of one or more circuit components may be represented in place of or in addition to the layout structures of these one or more circuit components.

For example, a symbolic representation of one or more circuit components may be represented in a layout by replacing these one or more circuit components with the symbolic representation so that the layout is no longer showing the layout structures of these one or more circuit components. In some other embodiments, a symbolic representation of one or more circuit components may be represented in a layout by overlaying the symbolic representation over these one or more circuit components with the symbolic representation so that the layout is showing both the overlaid symbolic representation and the layout structures of these one or more circuit components.

Figure 7A:
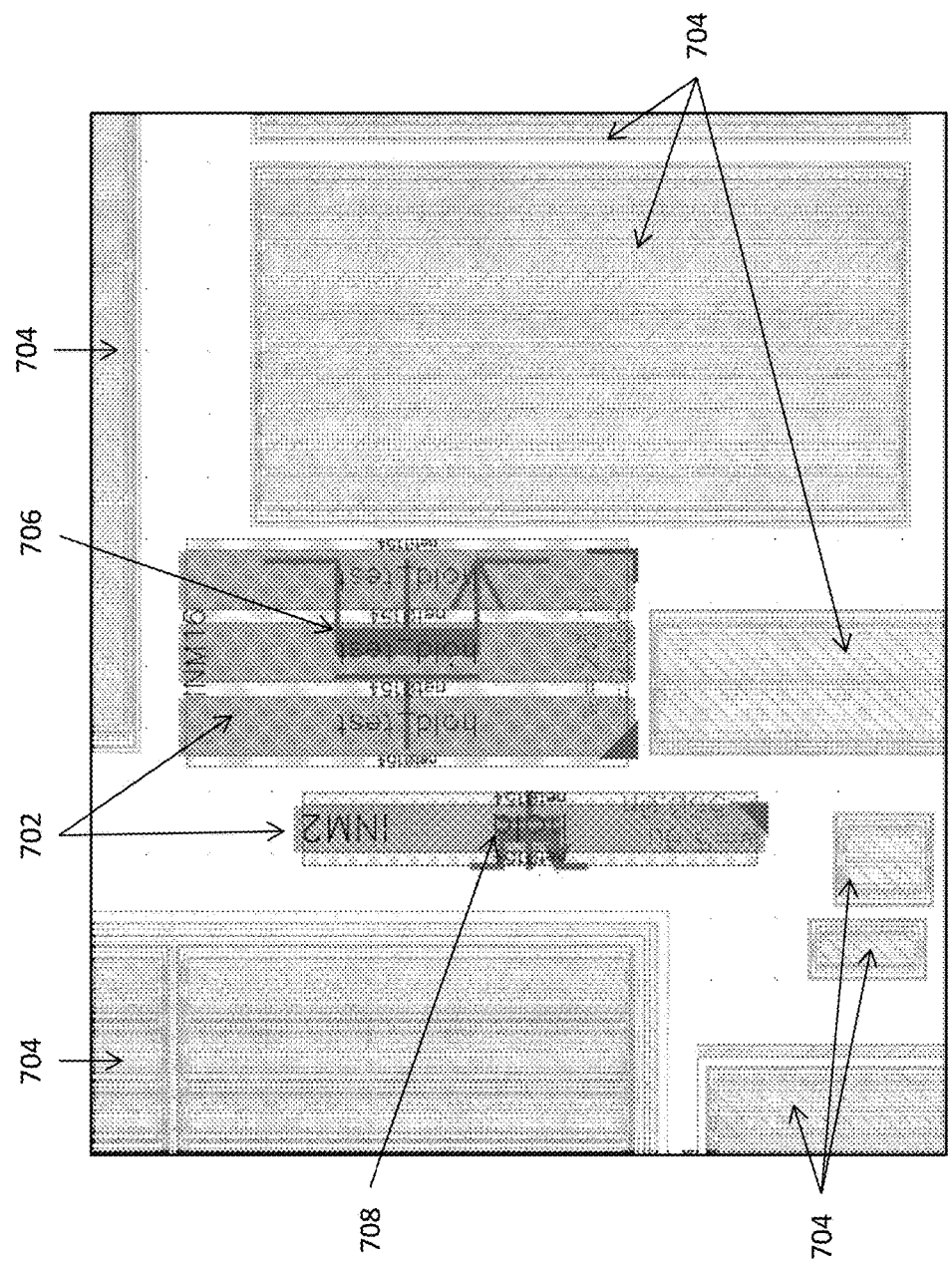

In the example illustrated in FIG. 7A showing an example of a symbolic representation of a simplified layout portion in some embodiments, the symbolic representation represents some MOS devices 702 in a simplified representation including only rectangles that exactly match the sizes of various shapes (e.g., the gates, the bodies, the sources, and the drains) of the MOS devices 702 in the layout. The symbolic representation in FIG. 7A further illustrates two schematic symbols (706 and 708) that are respectively overlaid on top of the corresponding layout structures of the MOS devices 702 with the proper orientations to ensure correct signal flow directions.

It is further noted that these two schematic symbols are also generated while considering the sizes of the corresponding layout structures so that the schematic symbols 706 and 708 are represented with proportional or appropriate sizes. In this example illustrated in FIG. 7A, the abstraction scope may be identified to include MOS devices as the type of layout circuit components for the symbolic representation in some embodiments or may be identified by the user's selection of these two MOS devices in the layout window. The symbolic representation also includes a modified representation of a plurality of surrounding circuit components (704) with dimmed appearances. In some embodiments, the surrounding circuit components outside the abstraction scope may be completely hidden in a symbolic representation.

At 210, one or more layout operations may be performed by the designer, one or more electronic design automation (EDA) tools, or both on the symbolic representation in the layout. These one or more layout operations may include, for example, placement decisions or options, editing the symbolic representation, optimizing the symbolic representation or a portion of the layout including the symbolic representation, various analyses, various verification tasks, etc. In some embodiments, these one or more layout operations treat the symbolic representation of the layout circuit component in exactly the same manner as they treat the layout circuit component in the layout.

In these embodiments, a symbolic representation behaves exactly as the layout circuit component and thus may be modified (e.g., modifications of the placement location, the size or dimensions, or any associated data thereof, etc.) as the layout circuit component. Although a symbolic representation appears in a user interface with fewer or simpler details, a symbolic representation nevertheless preserves all the detailed design data as the original layout circuit component without graphically and/or textually showing all such detailed design data in the user interface.

In these embodiments, a symbolic representation is in sharp contrast with a conventional symbolic representation which is obtained by creating one- or two-dimensional symbolic entities with information (e.g., instance name, cell name, connectivity information, etc.) that is generated from the schematic symbols in the corresponding schematic design with an intermediate processing module (e.g., a separate symbolic editor) usually running in a separate user interface window and discarding some undesired design details in the conversion process to arrive at the conventional symbolic representation. As a result, unlike the symbolic representation described herein, the conventional symbolic representation lacks full details of the underlying layout circuit component.

One of the advantages of various techniques described herein for generation of a symbolic representation is that the symbolic representation generated with these techniques preserves full details of the underlying layout circuit component and complete relation between underlying layout circuit components (e.g., the abutment relation between a plurality of MOS structures) without performing any conversion, mapping, or transformation and without any loss of details in the design data. Another advantage of these techniques is that these techniques need not generate any diagrams (e.g., a stick diagram, etc.) in the generation of a symbolic representation.

In addition, when a conventional symbolic representation is to be edited, the editing requires again the execution of the intermediate processing module. That is, a conventional symbolic representation is transmitted from the layout editor to the intermediate processing module for editing purposes. When the editing of the conventional symbolic representation is complete within the separate intermediate processing module, the symbolic representation is again transmitted back to the layout editor. In addition, a conventional symbolic representation may also be transmitted from the schematic editor to the intermediate processing module for editing purposes in some cases. In these cases, the separate, intermediate processing module is again invoked to receive and modify the symbolic schematic representation which is subsequently transmitted back to the schematic editor after the modification is complete. Moreover, if editing a conventional symbolic representation, which is generated without preserving the details of the design data, touches upon design data that were not captured during the generation of the symbolic representation, conventional approaches need to recapture such missing design data and generate another symbolic representation.

One advantage of some of the techniques described herein is the elimination of such intermediate processing modules and hence several roundtrips between the layout editor or a schematic editor and such an intermediate processing module for editing a symbolic representation. Rather, these techniques use the same layout editor or the layout editing mechanism that manipulates the layout to directly manipulate symbolic representations by performing these one or more layout operations. In these embodiments, a symbolic representation preserves all details of the corresponding layout circuit component(s) while presenting a customizable view to a designer for the corresponding layout circuit component(s).

On the other hand, a symbolic representation includes more information than the corresponding layout circuit component in that a symbolic representation also includes or is associated with additional information or data including, for example, the corresponding schematic symbol(s), various textual and/or graphical information describing the description of the layout circuit component or functional aspects of the layout circuit component or its subparts thereof, the flight-lines interconnecting the symbolic representation to another layout circuit component or another symbolic representation, etc. to aid various electronic design related tasks such as analyses, verification, simulations, debugging, etc.

Figure 3A:
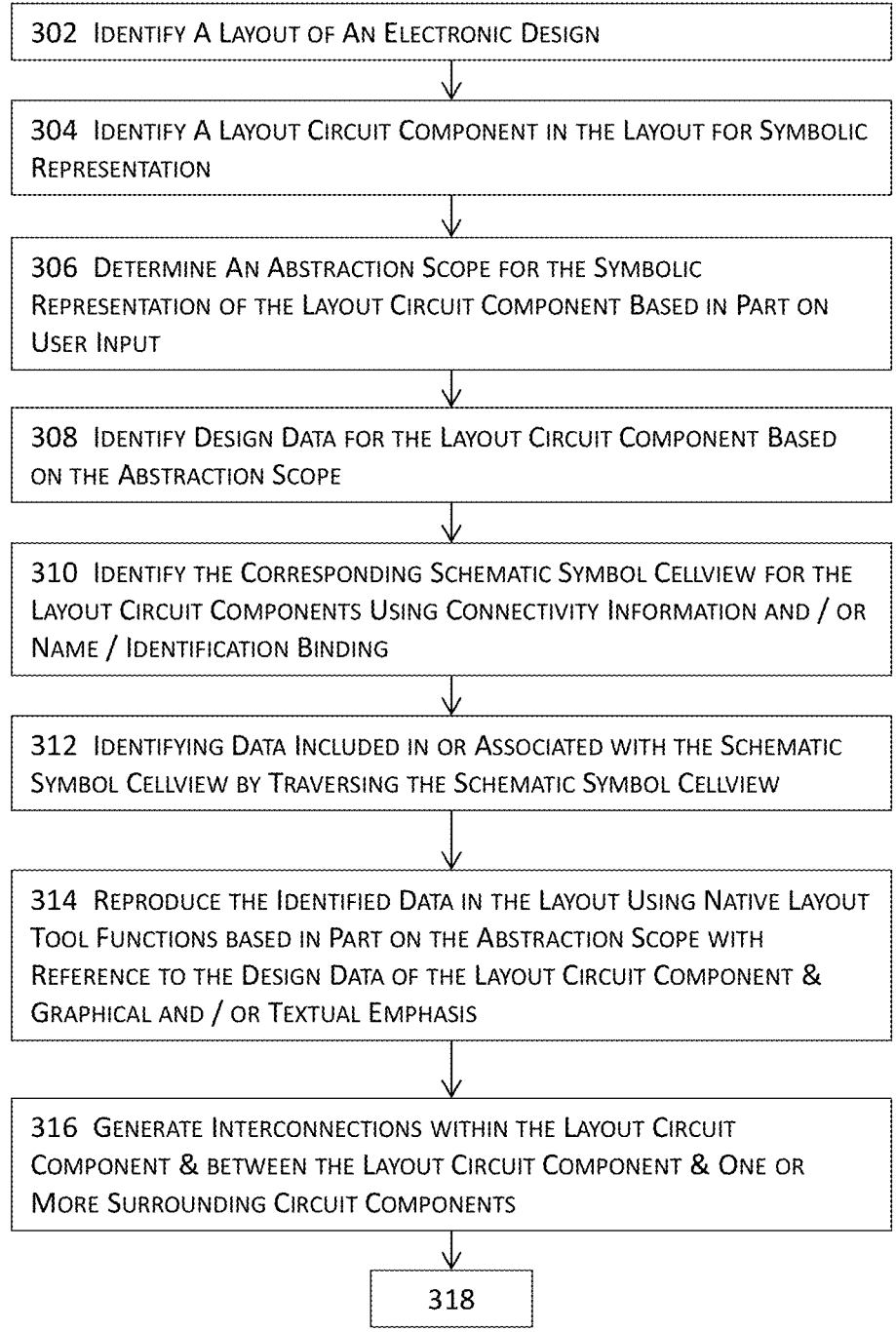
FIGS. 3A-B jointly illustrate a more detailed block diagram for implementing electronic design layouts with symbolic representations in one or more embodiments.
Figure 3B:
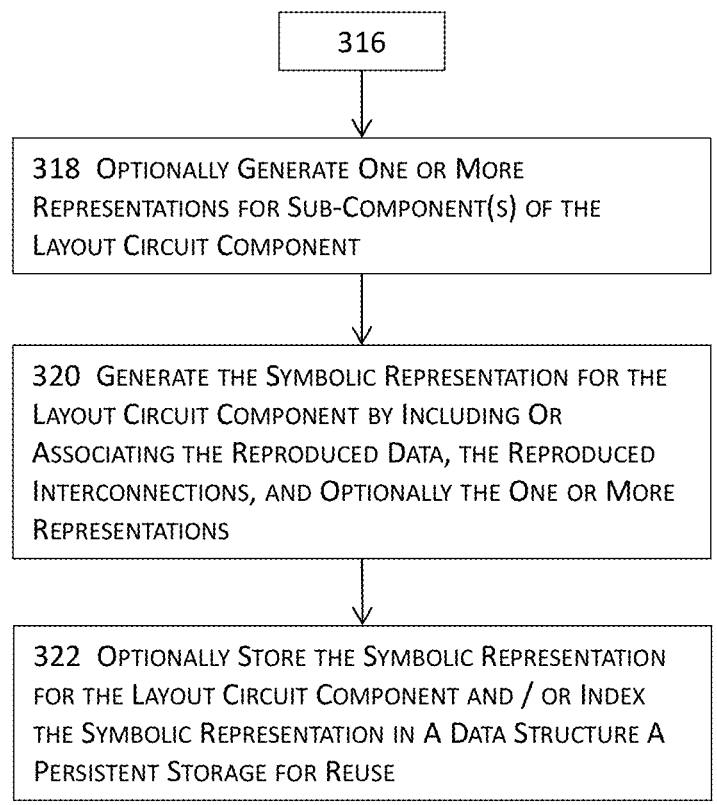

FIGS. 3A-B jointly illustrate a more detailed block diagram for implementing electronic design layouts with symbolic representations in one or more embodiments. More specifically, FIGS. 3A-B jointly describe more details about generation of a symbolic representation for a layout circuit component. In these one or more embodiments, a layout of an electronic design may be first identified at 302. In some of these embodiments, the corresponding schematic design for the same electronic design may also be identified at 302 although the schematic design may not necessarily be required for various techniques described herein to perform their intended functions or to achieve their intended purposes.

A layout circuit component for which a symbolic representation is desired may be identified at 304. In some embodiments, a layout circuit component may include, for example, one or more transistors, resistors, capacitors, inductors, interconnects or traces, macro blocks, various types of cells, various types of instances, intellectual property or IP blocks, any block of electrical circuitry or components, nets, dummy devices, or any combinations thereof, etc.

An abstraction scope for the symbolic representation may be determined at 306 for the layout component. For example, an abstraction scope may determine whether or not a symbolic representation is to illustrate one or more desired or undesired layers, nets, instances, cells, areas, etc. for a symbolic representation, additional textual information and/or graphical indications for the underlying layout circuit component or one or more subparts thereof, various types of distinguish bounding boxes for different types of components or layers, various physical (e.g., size, dimensions, etc.) and/or electrical properties (e.g., resistance, capacitance, inductance, etc.) related to the layout circuit component in some embodiments.

At 308, at least some design data for the layout circuit component may be identified based in part or in whole upon the abstraction scope determined at 306. Some examples of such design data may include the orientation, the size, or one or more dimensions of the layout circuit component. The design data identified at 308 may be used in, for example, determining the orientation of the symbolic representation such that the symbolic representation, when presented in a user interface window, shows correct signal flow directions, appears with a proper size relative to the layout circuit component, and exactly or approximately matches the actual size of the layout circuit component in the layout window in some embodiments.

In the example illustrate in FIGS. 7B-C which jointly shown a symbolic representation of two layout circuit components, the layout includes a layout view 700B including two layout circuit components—a pMOS 704B and an nMOS 710B. Each layout circuit component (704B or 710B) includes multiple layers. The abstraction mechanism may determine one or more layers (e.g., 706B) to show in the symbolic representation 702C and hide the remaining layer(s) (e.g., 706B). Based on this abstraction mechanism, the symbolic representation 702C may be generated via a symbolic representation generation mechanism 714B.

In the example illustrated in FIG. 7B, the polysilicon layer 708B including multiple shapes is generated as one rectangle 708C by merging these multiple shapes into the single rectangle 708C while the boundary segments between neighboring polysilicon shapes in 708B are eliminated in the single rectangle 708C. Similarly, the polysilicon layer 712B including multiple shapes is generated as one rectangle 712C by merging these multiple shapes into the single rectangle 712C while the boundary segments between neighboring polysilicon shapes in 712B are eliminated in the single rectangle 712C. The diffusion layers 706C of the pMOS 704B and the diffusion layer 710C of the nMOS 710B may be represented in different colors to distinguish these two diffusion layers between two different layout circuit components (704B and 710B).

At 310, a corresponding schematic symbol (e.g., a schematic symbol cellview) for the layout circuit component may be identified. In some embodiments, the schematic symbol may be identified by from a central repository (e.g., a schematic symbol data structure or a schematic symbol database). For example, a layout editor may identify the layout circuit component, identify the connectivity information (e.g., the name of a pin, net, instance, cell, etc.), and use the connectivity information in identification binding to identify the corresponding schematic symbol.

In some embodiments, the layout editing mechanism may traverse the layout to identify the layout circuit component of interest as well as, for example, a pin name, a port name, a net name connected to the layout circuit component, or any other name or identification related to the layout circuit component. The layout editing mechanism may then work in tandem with the schematic editing mechanism to identify the schematic instance that corresponds to the pin name, port name, etc. and identify the schematic symbol cellview for the schematic instance.

Additional data that are included in or associated with the schematic symbol may be identified at 312. In some embodiments, a cellview content identification mechanism may traverse the identified schematic symbol cellview to identify the pertinent content in the schematic symbol cellview based on the identified abstraction scope at 312. Other data including, for example, data concerning one or more layers, the sub-components of the layout circuit component, or any other data of interest may also be identified at 312.

For example, the cellview identification mechanism or the layout editing mechanism may further identify the orientation, size, and/or dimensions of the layout circuit component at 312. In the example illustrated in FIG. 7D, which illustrates some examples of data or information included in or associated with a schematic symbol cellview, the symbolic representation 700D of a corresponding layout circuit component includes the data or information such as the identification of the gate net 702D, the identification of the source net 704D, the identification of the bulk net 706D, the identification of an end marker 708D, one or more parameter values 710D such as physical and/or electrical parameter values, the orientation marker of the layout circuit component 712D, the drain net 714D of the layout circuit component, the source net 716D, the instance name or identification 718D of the layout circuit component.

Figure 7D:
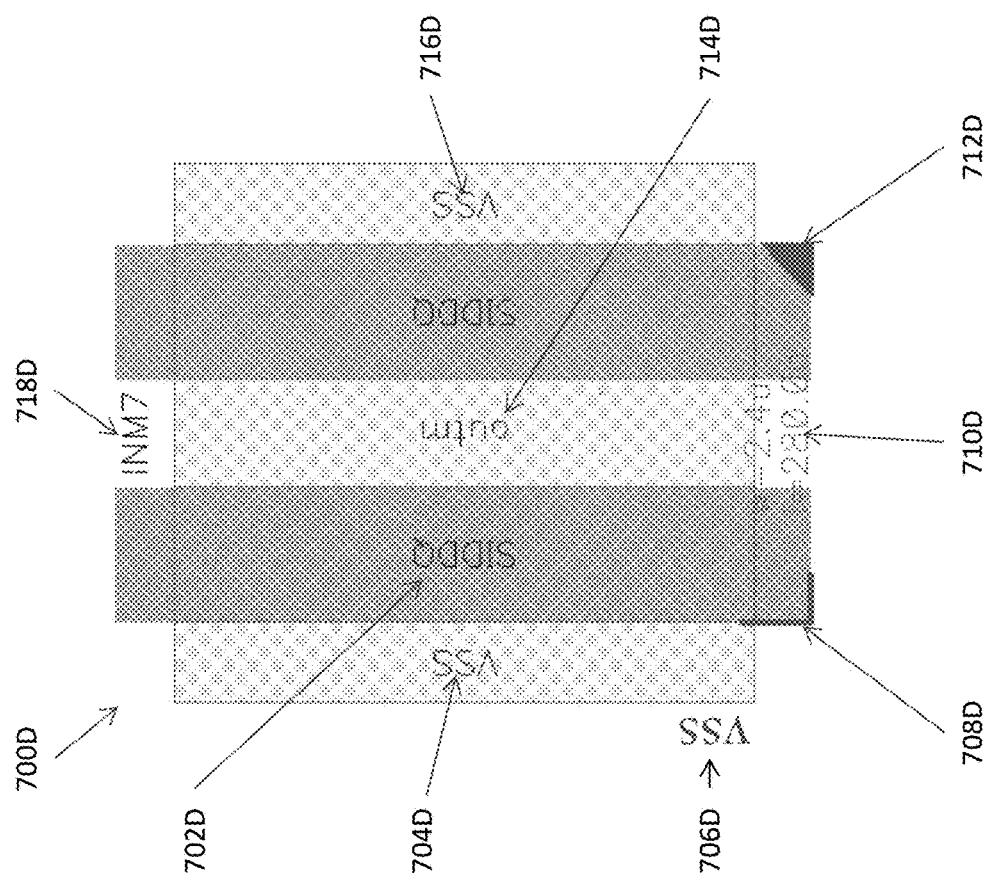

As it may be seen from FIG. 7D, these pieces of information or data are properly sized and positioned relative to the actual size of the layout circuit component. Furthermore, as previously described, the size or dimensions of the symbolic representation 700D may exactly or approximately match the actual size or dimensions of the layout circuit component.

At 314, the identified data may be reproduced in the layout window by using one or more native layout tool functions (e.g., functions to reproduce various geometric objects, a function to insert text or graphical information, etc.) of the layout editing mechanism that is also responsible for manipulating the layout, without performing any intermediate compilation, translation, mapping, or transformation with a separate processing module (e.g., a separate symbolic editor often running in a separate user interface window) or using any separate processing modules. In some of these embodiments, the identified data may be obtained from a symbolic representation data source described in greater details above with reference to FIG. 206.

In some embodiments, the layout editing mechanism reproduces at least a part of the reproduced data with graphical emphasis (e.g., different shadings, linetypes, line weights, highlights, etc.), textual emphasis (e.g., insertion of textual description), or both textual and graphical emphasis. In the example illustrated in FIG. 7E, which shows overlaying a schematic symbol on the corresponding layout circuit component represented as a symbolic representation, 702E illustrates a schematic symbol of an nMOS, and 704E illustrates a symbolic representation of the nMOS in a layout.

Figure 7E:
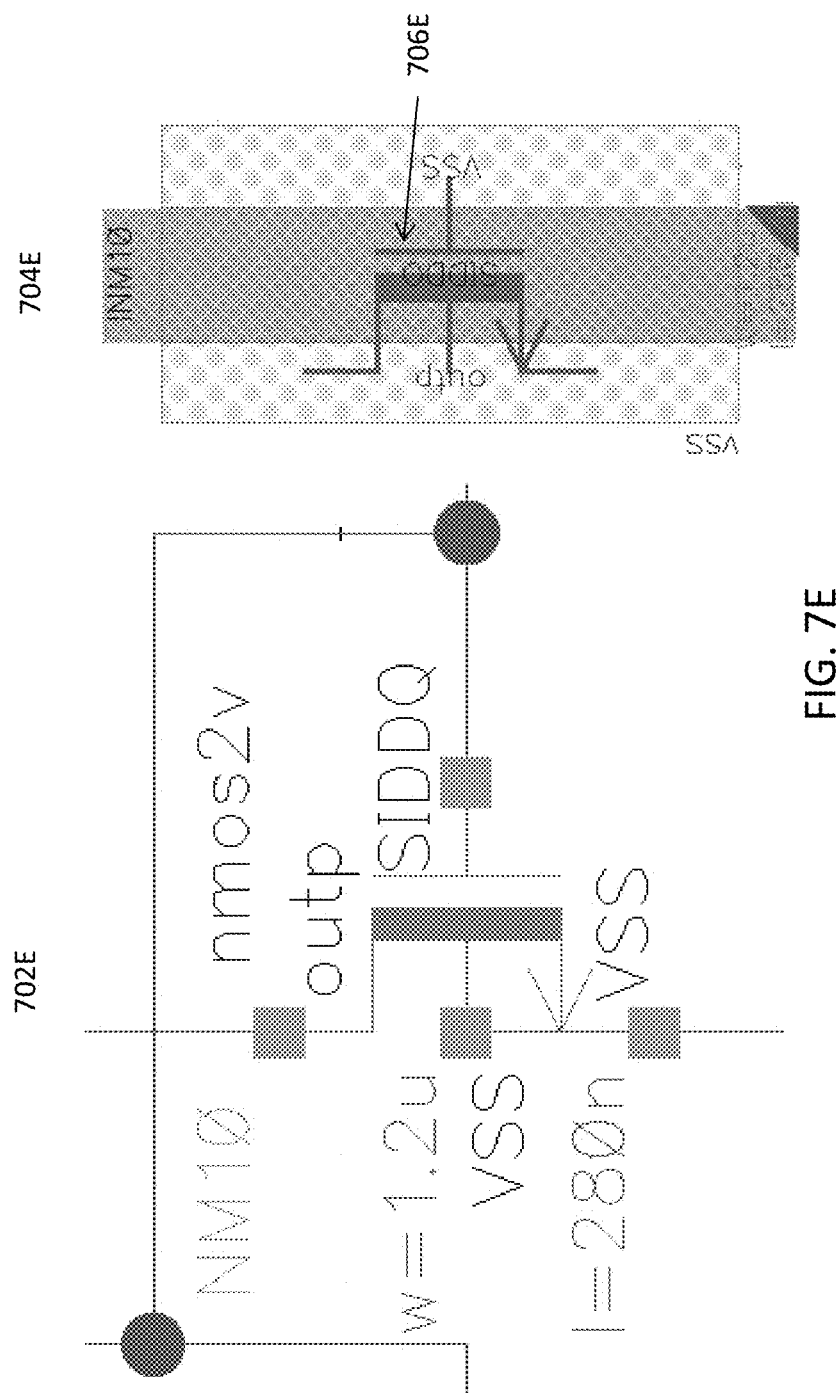

The symbolic representation 704E further includes a schematic symbol 706E of the nMOS overlaid on the simplified representation of the nMOS layout structure in a portion of the layout. As described above, the symbolic representation generation mechanism may reference the physical and electrical design data of the underlying layout circuit component to proportionally size the schematic symbol and to place the schematic symbol in the correct the orientation to reflect the signal flow direction through the layout circuit component as illustrated in FIG. 7E.

Figure 7F:
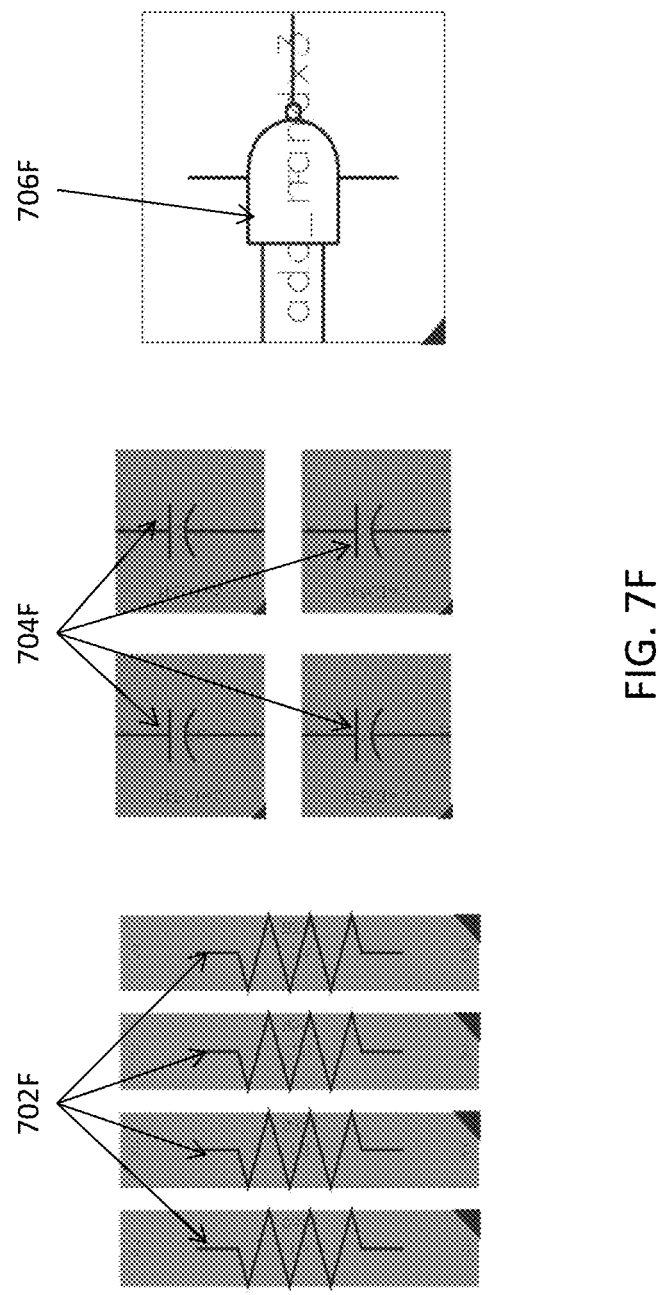

FIG. 7F further illustrates some examples of symbolic representations of certain layout circuit components with corresponding overlaid schematic symbols. 702F illustrates the symbolic representations of four resistors having overlaid resistor schematic symbols in the correct orientation and proportional sizes; 704F illustrates the symbolic representations of four capacitors having overlaid capacitor schematic symbols in the correct orientation and proportional sizes; and 706F illustrates the symbolic representations of an NAND (negative-AND) gate having an overlaid NAND schematic symbol in the correct orientation and proportional sizes.

Interconnections within the symbolic representation of the layout circuit component and/or between the symbolic representation and one or more other layout circuit components, symbolic representations, or any combinations thereof may be generated at 316. For example, the layout editing mechanism may invoke a channel router or a topological router to generate topological interconnections or flight-lines, rather than geometric routes between a symbolic representation and one or more other symbolic representations and/or surrounding layout circuit components.

One or more representations in the symbolic representation of the layout circuit component may also be optionally generated at 318. For example, the symbolic representation generation mechanism may merge multiple shapes and eliminate the neighboring boundary segments (e.g., boundaries between two neighboring polysilicon layers) and present these multiple shapes as one single shape in the symbolic representation in some embodiments. As another example, the symbolic representation generation mechanism may use the native layout editor functions to reproduce the same layers of different layout circuit components with different graphical and/or textual emphasis to distinguish these same layers from each other in the symbolic representation of these different layout circuit components.

For example, the diffusion layer of a pMOS and that of an nMOS may be generated or produced in different colors or other graphical emphasis to distinguish the same diffusion layer of two different layout circuit components. At 320, the symbolic representation for the layout circuit component may be generated to include or associate with the data reproduced at 314, the interconnections or flight-lines generated at 316, and/or the one or more representations for sub-components of the layout circuit component generated at 318. The symbolic representation may be optionally stored at 322 in some embodiments. In some of these embodiments, the stored symbolic representations may be further indexed with unique keys reflecting the underlying layout circuit components and the corresponding abstraction scopes.

FIG. 4 illustrates a more detailed block diagram for implementing electronic design layouts with symbolic representations in one or more embodiments. More specifically, FIG. 4 illustrates more details about generation of a symbolic representation of a layout circuit component. In some embodiments, the layout circuit component may be further optionally identified into a functional group of layout circuit components at 402, and a first symbolic representation may be generated by using substantially similar or identical techniques described above for the functional group at 404.

Figure 7G:
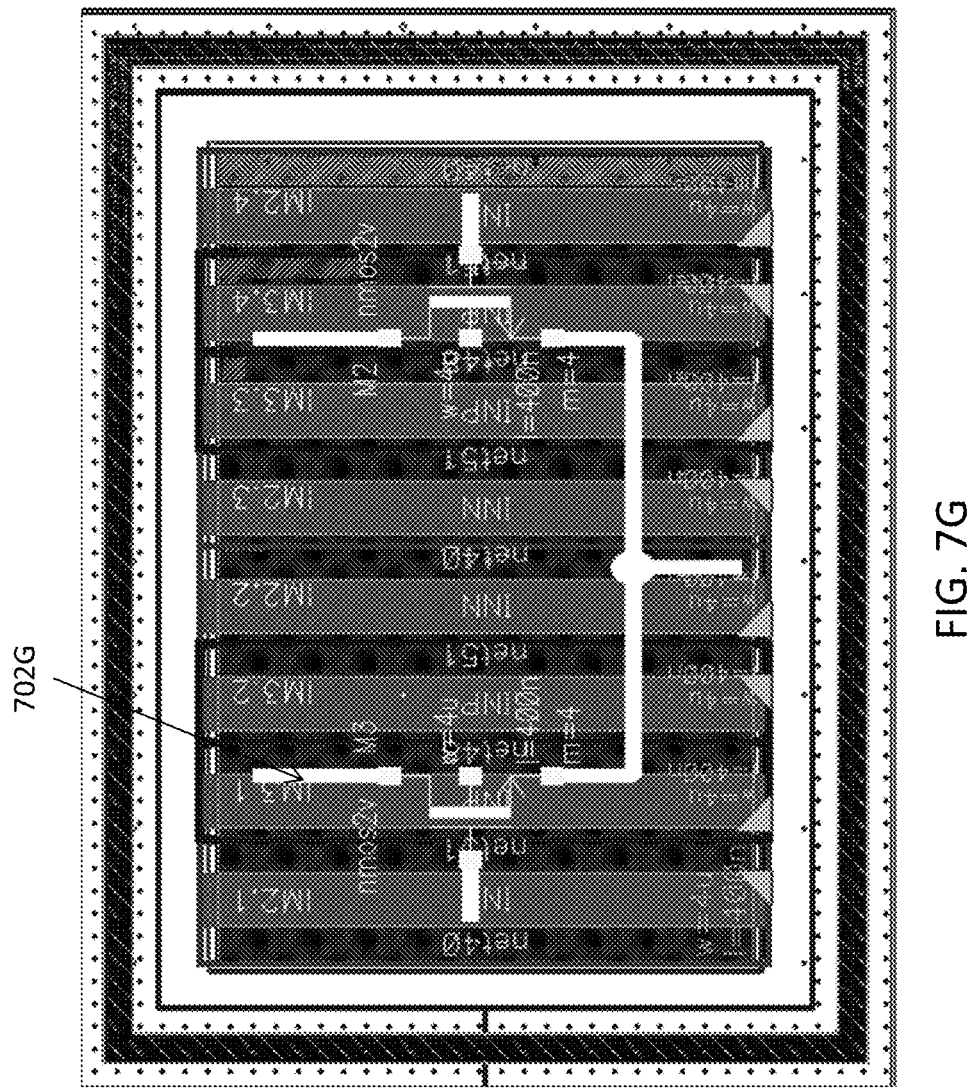
Figure 7H:
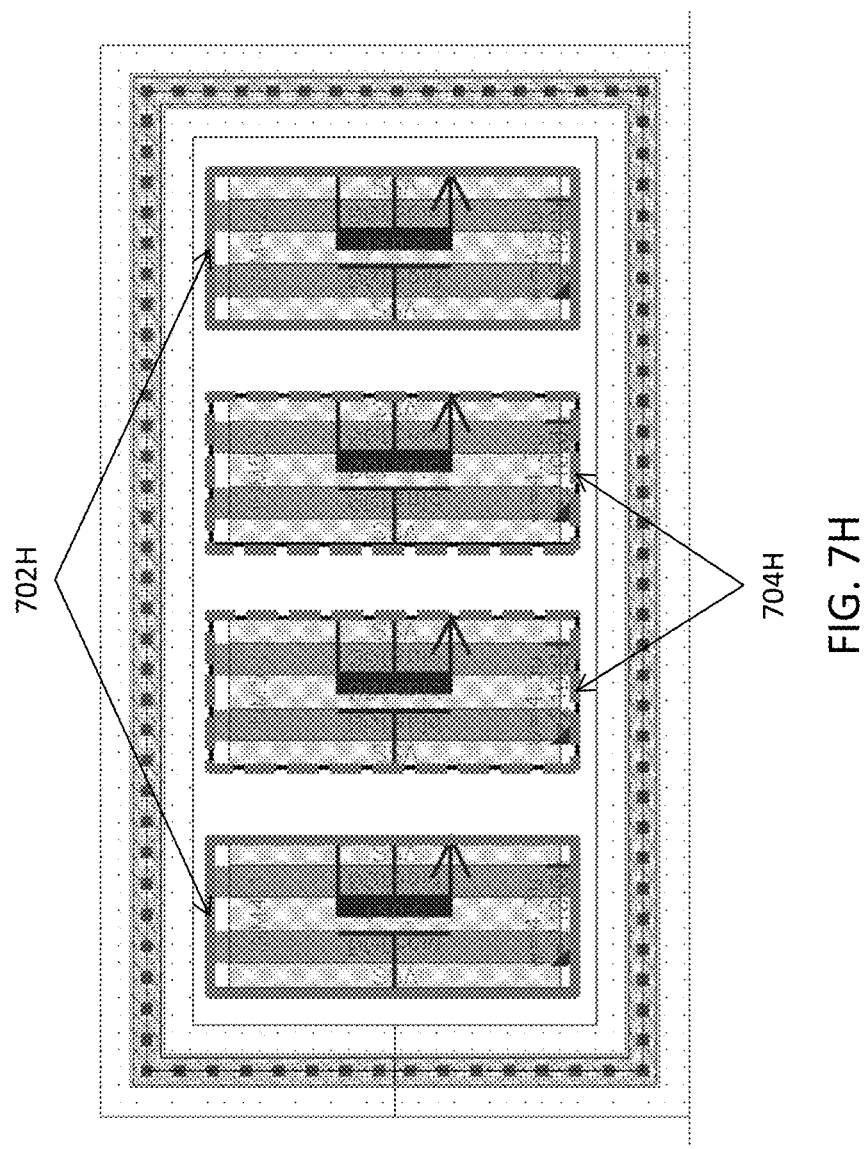

In the example illustrated in FIG. 7G, which shows a functional group of a plurality of nMOS's that transmit information using two complementary signals, the plurality of nMOS's may be identified into a functional group of a differential pair at 402 by referencing electrical design data of these nMOS's, and the symbolic representation generation mechanism may reproduce the MOS differential pair schematic symbol 702G in the symbolic representation of the plurality of nMOS's. At 406, one or more m-factored layout circuit devices may be identified in a layout. An m-factored device includes multiples of a circuit component that are connected in parallel and may be compared with an s-factored device in which multiples of a circuit component are connected in series.

One or more first bounding boxes may be generated for one or more first instances of a first schematic circuit component in the one or more m-factored layout circuit devices at 408. In some embodiments, these first bounding boxes may be generated with the first graphical and/or textual emphasis. For example, these first bounding boxes may be generated with the blue line color or the blue shading. One or more second bounding boxes may be optionally generated for one or more second instances of a second schematic circuit component, if exist, in these one or more m-factored layout circuit devices at 410.

In some embodiments, these second bounding boxes may be generated with the second graphical and/or textual emphasis. For example, these first bounding boxes may be generated with the red line color or the red shading. At 412, a match pattern may be identified by referencing the arrangement of the one or more first and second instances in some embodiments. The first graphical and/or textual emphasis and the second graphical and/or textual emphasis may also provide visual aide for a designer to visualize the match pattern. In the example illustrated in FIG. 7H, which shows bounding boxes having different graphical emphasis for different layout circuit devices, 702H indicates two first bounding boxes ("A") of two first instances of a first schematic circuit component, and 704H indicates two second bounding boxes ("B") of two second instances of a second schematic circuit component.

The two first instances are placed in the layout to sandwich the two second instances. The match pattern "A B B A" may be identified by referencing the arrangement of the first and second instances. In addition, the two sets of bounding boxes having different graphical emphasis (solid line-type for A and dashed line-type for B) may further provide visual aid for a designer to visualize the match pattern. One or more third bounding boxes may be generated for dummy layout circuit components with the third graphical and/or textual emphasis at 414, and the first symbolic representation in the layout may be updated at 416 with the first and second bounding boxes, and further optionally with the third bounding boxes.

Figure 7J:
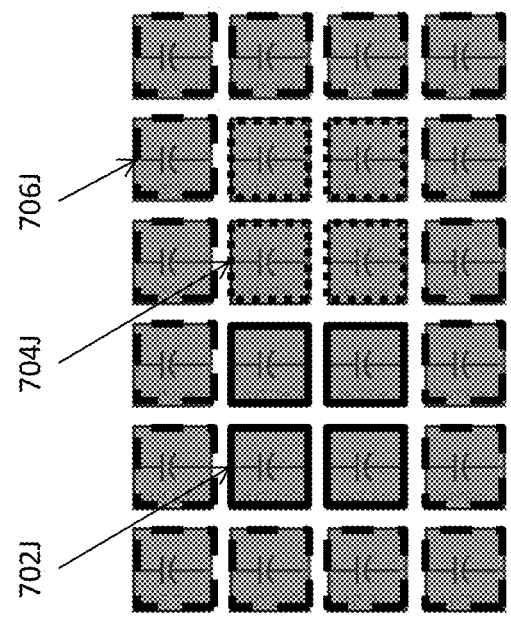
Figure 7I:
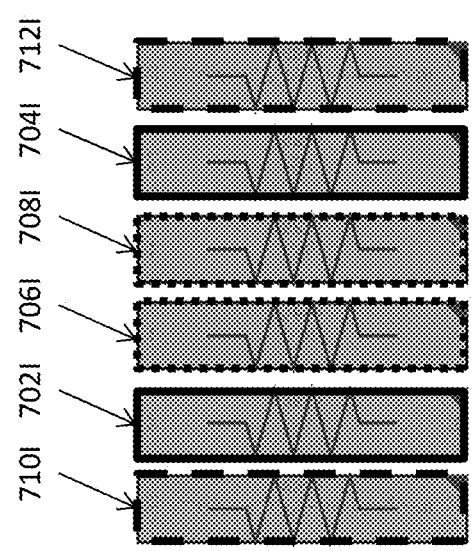

In the example illustrated in FIG. 7I, which shows bounding boxes having different graphical emphasis for m-factored layout circuit devices, 702I and 704I indicate two first bounding boxes ("A") of two first instances of a first resistor, 706I and 708I indicate two second bounding boxes ("B") of two second instances of a second resistor, and 710I and 712I indicate two third bounding boxes ("C") of two third instances of a third resistor. The match pattern "C A B B A C" may be identified by referencing the arrangement of the first, second, and third instances. In addition, the three sets of bounding boxes having different graphical emphasis (solid line-type for A, first dashed line-type for B, and second dashed line-type for C) may further provide visual aid for a designer to visualize the match pattern. In some embodiments where the third layout circuit component represents a dummy circuit component, the match pattern is then "d A B B A d", where "d" denotes a "dummy" component.

In the example illustrated in FIG. 7J, which shows bounding boxes having different graphical emphasis for m-factored layout circuit devices, 702J indicates four first bounding boxes ("A") of four first instances of a first capacitor, 704J indicates four second bounding boxes ("B") of four second instances of a second capacitor, and 706J indicates a plurality of third bounding boxes ("C") of a plurality of third instances of a third capacitor. The following match pattern (a two dimensional array) for the first and second instances may be identified by referencing the arrangement of the first and second instances:

"C A A B B C
C A A B B C"

In some embodiments where the third layout circuit component represents a dummy circuit component, the match pattern is then:

"d d d d d
d A A B B d
d A A B B d
d d d d d"

In addition, the three sets of bounding boxes having different graphical emphasis (solid line-type for A, first dashed line-type for B, and second dashed line-type for C) may further provide visual aid for a designer to visualize the match pattern.

Figure 5:
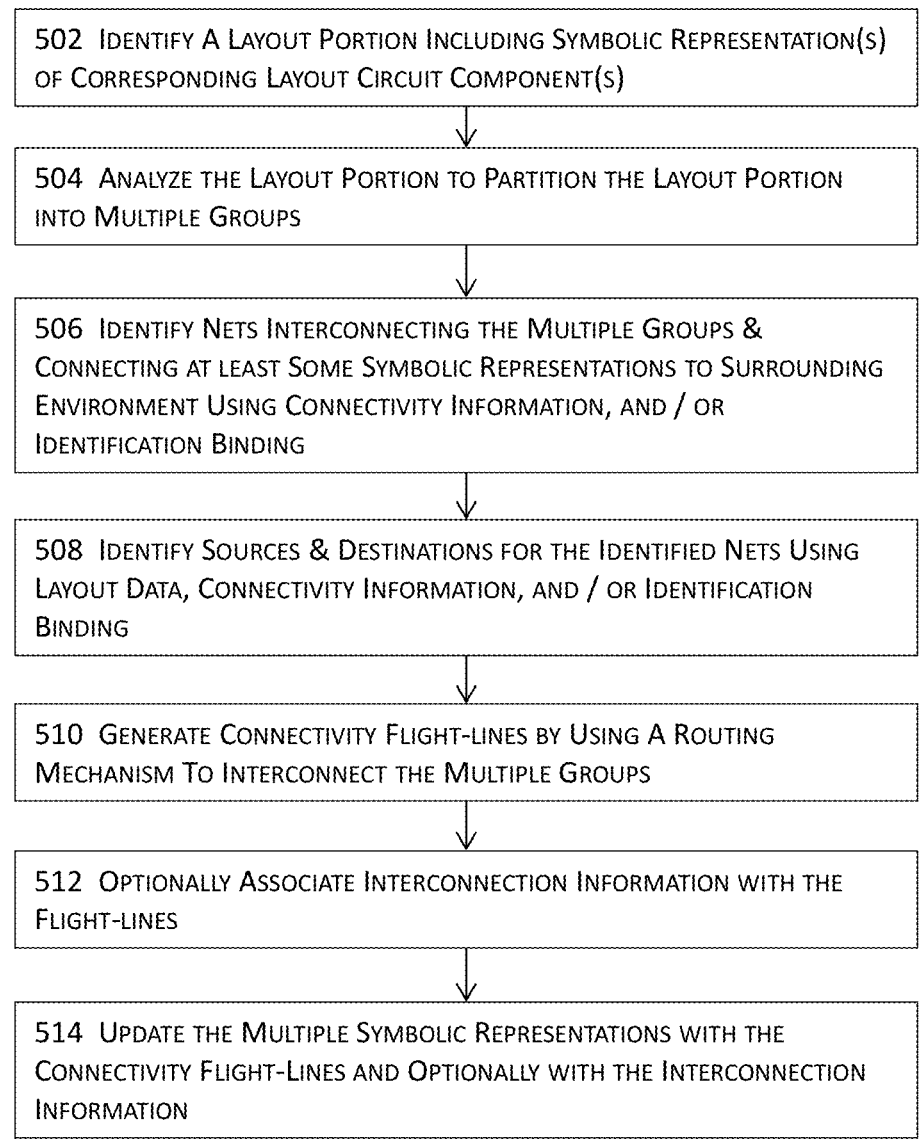
FIG. 5 illustrates a more detailed block diagram for implementing electronic design layouts with symbolic representations in one or more embodiments.

FIG. 5 illustrates a more detailed block diagram for implementing electronic design layouts with symbolic representations in one or more embodiments. More specifically, FIG. 5 illustrates more details about generating flight-lines in a layout with symbolic representations. In these embodiments, a layout portion including one or more symbolic representations of one or more corresponding layout circuit components may be identified at 502. The identified layout portion may then be identified and partitioned into multiple groups or classes at 504 by a classification and partitioning mechanism.

Figure 7K:
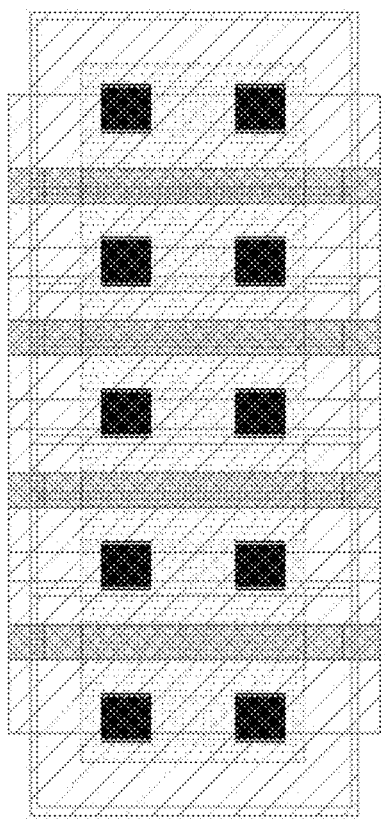
Figure 1:
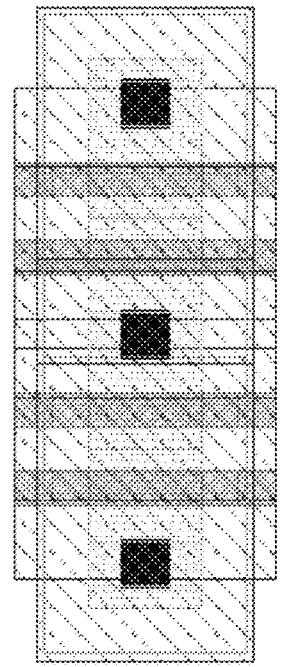
Figures 2, 7K:
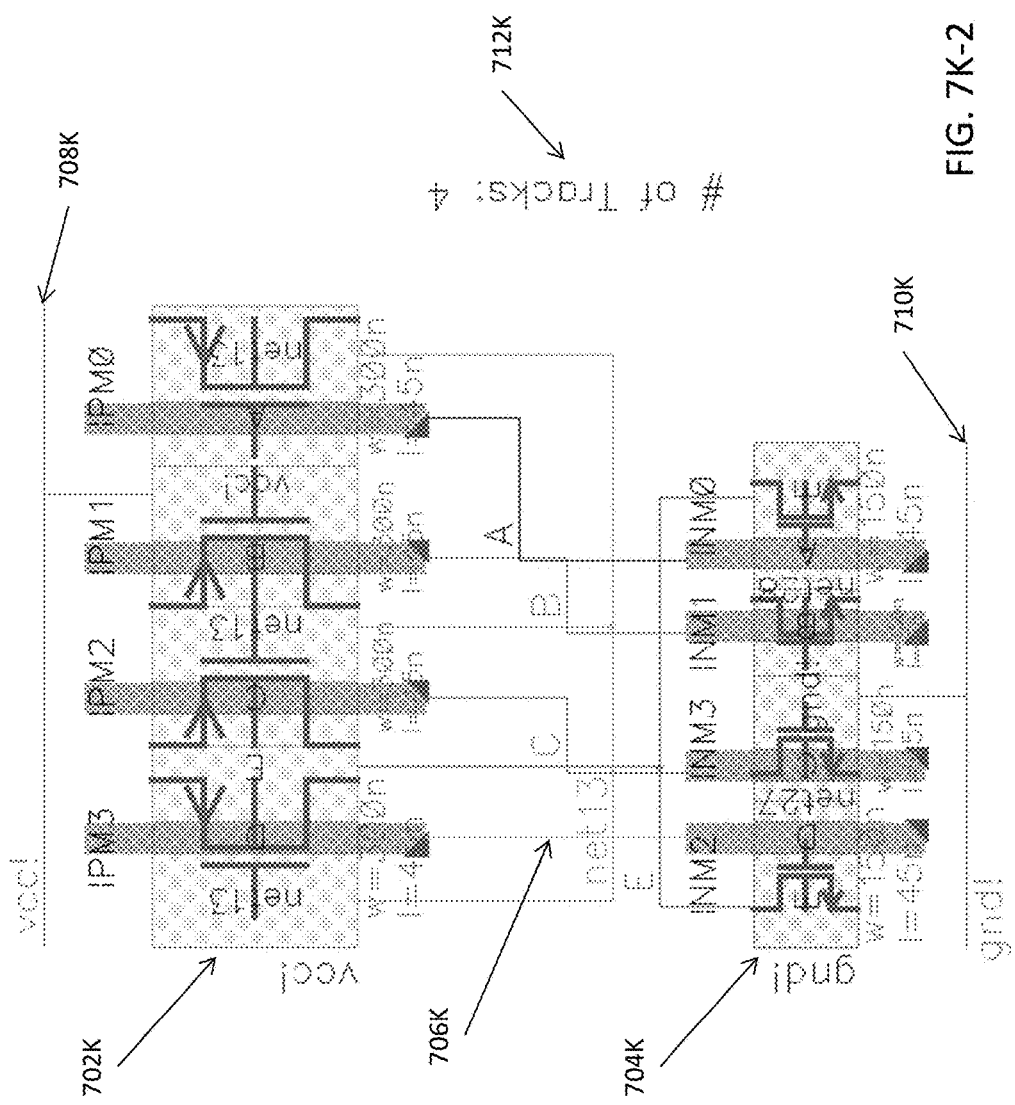
Figure 7L:
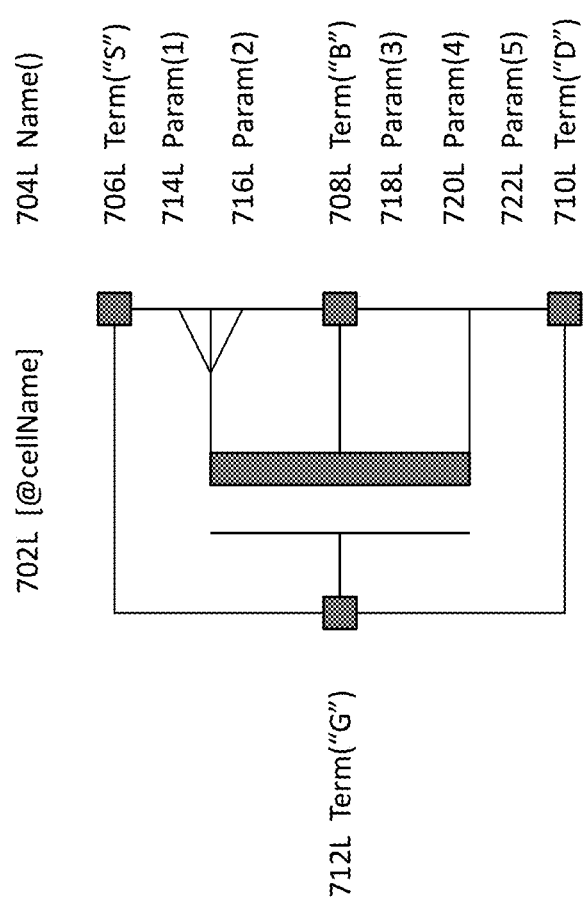

For example, the layout portion may be analyzed into multiple rows each including one or more layout circuit components and/or one or more symbolic representations by classifying the circuit components and symbolic representations based in part or in whole on connectivity information (e.g., the direction of the signals or the nets on the sources and destinations of these circuit components and symbolic representations) at 504. In the example illustrated in FIG. 7K-1, which shows a portion of an original circuit layout. While in FIG. 7K-2, which shows a portion of a simplified layout, the layout portion includes the first symbolic representation of a P stripe 702K including a representation of four circuit components while two circuit components connected to the power net (represented by the flight-line 708K). FIG. 7K-2 further includes the number of tracks (four tracks in this example).

The layout portion also includes the second symbolic representation of an N stripe 704K that includes a representation of four circuit components while two of the four circuit components connected to the ground net (represented by the flight-line 710K). The classifying and partitioning mechanism may classify these eight instances of circuit components into two groups—the first group being the P stripe, and the second group being the N stripe—based on the connectivity information or the source and/or destination nets of these components. At 506, one or more nets interconnecting the multiple groups identified at 504 as well as one or more nets connecting the one or more symbolic representations to one or more surrounding environment may be identified based in part or in whole upon connectivity information and/or identification or name binding.

For example, the nets or net segments of interest may be identified from a schematic design, and the corresponding nets or net segments may be identified from a layout by referencing the identifications (e.g., names) of these nets or net segments, ports, etc. from the schematic design to determine the corresponding nets or net segments in the layout. Similarly, the sources and destinations of these identified nets may be identified at 508 using at least some layout data, connectivity information, and/or identification binding. With the sources and destinations identified, connectivity flight-lines (or simply flight-lines) may be generated at 510 by using a routing mechanism to determine the interconnections among the multiple groups or between circuit components in these groups and/or the surrounding environment.

In some embodiments, the flight-lines may be generated with a topological or channel routing mechanism to create topological routes. Unlike a conventional flight-line that includes only a straight line segment connecting a source and a destination. Some of these topological routes may include one or more orthogonal bends as illustrated by flight-lines 706K in FIG. 7K-2. Topological routes or C-routes differ from detail routes that represent how interconnects are to be actually implemented in a design. Rather, topological routes or C-routes indicate which source is connected to which destination and do not represent how the source is actually and geometrically connected to the destination.

As illustrated in FIG. 7K-2, the flight-lines generated by the techniques described herein belong to the symbolic representation of the layout portion and provide, in conjunction with the symbolic representation of the layout shapes in 702K and 704K, a clean representation for the much more complex layout geometries while preserving all the detailed design data. In addition, the layout portion represented with one or more symbolic representations can be manipulated in exactly the same manner as a conventional layout including complex geometries which may obscure or hinder various electronic design activities. The interconnection information may be optionally associated with the flight-lines at 512, and the multiple symbolic representations may be updated with the connectivity flight-lines and optionally with the interconnection information at 514 in some embodiments.

System Architecture Overview

Figure 6:
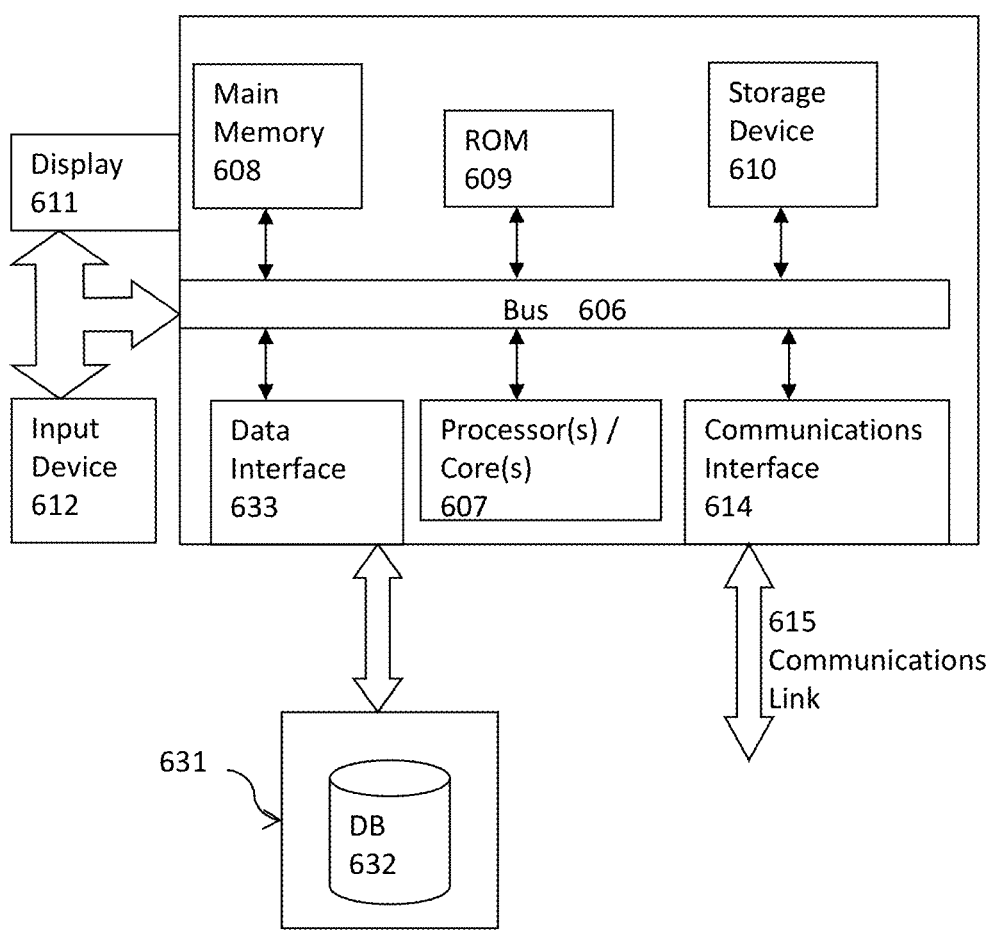
FIG. 6 illustrates a computerized system on which a method for performing channel analyses for a communication interface of an electronic system and a method for implementing electronic design layouts with symbolic representations may be implemented.

FIG. 6 illustrates a block diagram of an illustrative computing system 600 suitable for implementing electronic design layouts with symbolic representations as described in the preceding paragraphs with reference to various figures. Computing system 600 includes a bus 606 or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

According to one embodiment, computing system 600 performs specific operations by one or more processors or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads.

For example, the act of determining an abstraction scope, the act of identifying data included in or associated with a schematic symbol, the act of reproducing data included in or associated with a schematic symbol in a layout, the act of generating symbolic representations, the act of performing layout operations on symbolic representations, the act of traversing schematic symbols, the act of determining interconnections within a symbolic representation and/or interconnections between a symbolic representation and another symbolic representation, a layout circuit component, or a combination thereof, the act of generating bounding boxes for symbolic representations, the act of analyzing a layout, the act of partitioning a layout or a portion thereof, the act of generating topological routes or flight-lines, or any other acts that are described, required, or desired for various mechanisms or methods to achieve their intended purposes, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor(s) or processor core(s) 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computing system 600. According to other embodiments of the invention, two or more computing systems 600 coupled by communication link 615 (e.g., LAN, PTSN, or wireless network) may perform the sequence of instructions required to practice the invention in coordination with one another.

Computing system 600 may transmit and receive messages, data, and instructions, including program, i.e., application code, through communication link 615 and communication interface 614. Received program code may be executed by processor(s) or processor core(s) 607 as it is received, and/or stored in disk drive 610, or other non-volatile storage for later execution. In an embodiment, the computing system 600 operates in conjunction with a data storage system 631, e.g., a data storage system 631 that includes a database 632 that is readily accessible by the computing system 600. The computing system 600 communicates with the data storage system 631 through a data interface 633. A data interface 633, which is coupled with the bus 606, transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing electronic design layouts with symbolic representations, comprising:
    determining an abstraction scope including a specification of an extent, one or more functions, one or more types, or one or more constituents of a layout circuit component in a layout in a physical domain of an electronic design by referencing a user input or one or more default settings of an abstraction module;
    identifying, with a layout editing module including or coupled with at least one micro-processor, first data that are included in or associated with a schematic symbol for the layout circuit component by executes the layout editing module that traverses data in a symbolic representation data source in a schematic domain based in part or in whole upon the abstraction scope;
    generating a symbolic representation in the physical domain for the layout circuit component by reproducing at least some of the first data in the layout in the symbolic representation; and
    performing one or more layout operations on the symbolic representation with at least the layout editing module to improve the layout and to generate a result set for the one or more layout operations, wherein the symbolic representation preserves layout design details yet presents a smaller subset of the layout design details of the layout circuit component in the layout.

2. The computer implemented method of claim 1, the act of generating the symbolic representation for the layout circuit component including:
    reproducing the at least some of the first data in the layout with one or more native functions of the layout editing module based in part or in whole upon layout design data of the layout circuit component, wherein a native function of the one or more native functions is configured to enable the layout editing module to access, understand, invoke, and execute the native function without performing intermediate processing with a separate processing module, and the symbolic representation is generated without using a separate processing module in addition to the layout editing module.

3. The computer implemented method of claim 1, the act of identifying the first data comprising:

determining layout design data of the layout circuit component from the layout based in part or in whole upon the abstraction scope; and identifying a schematic symbol for the layout circuit component by retrieving a connection of or associated with the layout circuit component from at least layout connectivity information and determining the schematic symbol via identification binding between the layout connectivity information and schematic connectivity information or the layout design data of the layout circuit component.

4. The computer implemented method of claim 3, the act of identifying the first data further comprising:

identifying schematic symbol content or first layout design data of at least a portion of the layout that is specified as the first data in the abstraction scope;

identifying one or more other symbolic representations or one or more layout circuit components connected to the layout circuit component from a surrounding environment of a layout circuit symbol to traverse the layout based in part or in whole upon the layout connectivity information; and identifying data included in or associated with the one or more other symbolic representations or the one or more layout circuit components into the first data.

5. The computer implemented method of claim 1, the act of generating the symbolic representation further comprising:

identifying a plurality of sub-components of the layout circuit component by examining layout design data of the layout circuit component;

generating one or more additional symbolic representations for the plurality of sub-components by reproducing the plurality of sub-components based in part or in whole upon the abstraction scope; and updating the symbolic representation of the layout circuit component by including the one or more additional symbolic representations for the plurality of sub-components in the symbolic representation.

6. The computer implemented method of claim 5, the act of generating the one or more additional symbolic representations for the plurality of sub-components further comprising:

identifying one or more common boundary segments between the plurality of sub-components of the layout circuit component by examining the layout design data of the plurality of sub-components; and eliminating a graphical representation of the one or more common boundary segments in the one or more additional symbolic representations.

7. The computer implemented method of claim 1, wherein the symbolic representation is inserted into the layout in a user interface window, and the symbolic representation is represented in place of or at least partially in addition to the layout circuit component, and the symbolic representation is inserted into the layout with an orientation based in part or in whole upon electrical design data or a size determined based in part or in whole upon layout design data of the layout circuit component.

8. The computer implemented method of claim 1, further comprising:

identifying the layout circuit component and adding the layout circuit component into a functional group including a plurality of layout circuit components by examining the functional group to determine whether the functional group jointly performs a circuit function; and generating a first symbolic representation for the functional group based in part or in whole upon layout or electrical design data of the functional group, wherein the first symbolic representation includes a first schematic symbol of the functional group but not the schematic symbol of the layout circuit design component.

9. The computer implemented method of claim 1, further comprising:

identifying m-factored layout circuit components, wherein an m-factor layout component includes multiples of a layout component connected in parallel with each other; and generating one or more first bounding boxes for one or more first instances of a first schematic circuit component in the m-factored layout circuit components by reproducing the one or more first bounding boxes with a first graphical or textual emphasis.

10. The computer implemented method of claim 9, further comprising:

generating one or more second bounding boxes for one or more second instances of a second schematic circuit component in the m-factored layout circuit components by reproducing the one or more second bounding boxes with a second graphical or textual emphasis;

identifying a match pattern for the m-factored layout circuit components by identifying and comparing the first graphical or textual emphasis with the second graphical or textual emphasis; and generating a visual aid for the match pattern to a user with the first graphical or textual emphasis with the second graphical or textual emphasis.

11. The computer implemented method of claim 10, further comprising:

generating one or more third bounding boxes for one or more third instances of a third layout circuit component in the m-factored layout circuit components by reproducing the one or more third bounding boxes with a third graphical or textual emphasis, wherein the one or more third instances comprise one or more dummy circuit components; and updating the symbolic representation by referencing the one or more first bounding boxes, the one or more second boxes, or the one or more third bounding boxes.

12. The computer implemented method of claim 1, further comprising:

identifying a layout portion of the layout including one or more symbolic representations of one or more layout circuit components; and partitioning the one or more symbolic representations in the layout portion by analyzing the layout portion based in part or in whole upon connectivity information and by grouping the one or more symbolic representations into multiple groups.

13. The computer implemented method of claim 12, further comprising:

identifying one or more nets connecting the multiple groups or connecting at least a part of the multiple groups to a surrounding environment based in part or in whole upon the connectivity information or identification binding between the schematic domain and the physical domain; and identifying one or more sources and one or more destinations for the one or more nets by examining the connectivity information related to the one or more nets.

14. The computer implemented method of claim 13, further comprising:

identifying one or more flight-lines connecting at least some of the multiple groups or at least a part of the multiple groups to the surrounding environment by determining the one or more flight-lines based in part or in whole upon the one or more sources and one or more destinations;

associating interconnection information with the one or more flight-lines; and updating the one or more symbolic representations with the one or more flight-lines or the interconnection information.

15. A system for implementing electronic design layouts with symbolic representations, comprising:

a plurality of modules, at least one of which comprises at least one processor or a processor core that executes one or more threads in a computing system;

a non-transitory computer accessible storage medium storing thereupon program code that includes a sequence of instructions that, when executed by the at least one micro-processor or processor core of a computing system, causes the at least one micro-processor or processor core at least to:

determine an abstraction scope including a specification of an extent, one or more functions, one or more types, or one or more constituents of a layout circuit component in a layout in a physical domain of an electronic design by referencing a user input or one or more default settings of an abstraction module;

identify, at a layout editing module including or coupled with at least one micro-processor, first data that are included in or associated with a schematic symbol for the layout circuit component by executes the layout editing module that traverses data in a symbolic representation data source in a schematic domain in a schematic domain the abstraction scope with the layout editing module;

generate a symbolic representation in the physical domain for the layout circuit component by reproducing at least some of the first data in the layout in the symbolic representation; and perform one or more layout operations on the symbolic representation with at least the layout editing module to improve the layout and to generate a result set for the one or more layout operations, wherein the symbolic representation preserves layout design details yet presents a smaller subset of the layout design details of the layout circuit component in the layout.

16. The system of claim 15, wherein the non-transitory computer accessible storage medium holds the program code, and the program code includes further instructions that, when executed by the at least one micro-processor or processor core, cause the at least one processor or processor core to:

determine layout design data of the layout circuit component form the layout based in part or in whole upon the abstraction scope;

identify a schematic symbol for the layout circuit component by retrieving a connection of or associated with the layout circuit component from at least layout connectivity information and determining the schematic symbol via identification binding between the layout connectivity information and schematic connectivity information;

identify schematic symbol content that falls within the abstraction scope as the first data;

identify one or more other symbolic representations or one or more layout circuit components connected to the layout circuit component from a surrounding environment of the layout circuit symbol by traversing the layout with a schematic symbol content identification module or the layout editing module based in part or in whole upon the layout connectivity information; and identify data included in or associated with the one or more other symbolic representations or the one or more layout circuit components into the first data.

17. The system of claim 15, wherein the non-transitory computer accessible storage medium holds the program code, and the program code includes further instructions that, when executed by the at least one processor or processor core, causes the at least one micro-processor or processor core to:

identify a plurality of sub-components of the layout circuit component by examining layout design data of the layout circuit component;

generate one or more additional symbolic representations for the plurality of sub-components by reproducing the plurality of sub-components based in part or in whole upon the abstraction scope;

update the symbolic representation of the layout circuit component by including the one or more additional symbolic representations for the plurality of sub-components in the symbolic representation;

identify one or more common boundary segments between the plurality of sub-components of the layout circuit component by examining the layout design data of the plurality of sub-components; and eliminate a graphical representation of the one or more common boundary segments in the one or more additional symbolic representations.

18. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing electronic design layouts with symbolic representations, the set of acts comprising:

determining an abstraction scope including a specification of an extent, one or more functions, one or more types, or one or more constituents of a layout circuit component in a layout in a physical domain of an electronic design by referencing a user input or one or more default settings of an abstraction module;

identifying first data that are included in or associated with a schematic symbol for the layout circuit component by executes a layout editing module that traverses data in a symbolic representation data source in a schematic domain based in part or in whole upon the abstraction scope;

generating a symbolic representation in the physical domain for the layout circuit component by reproducing at least some of the first data in the layout in the symbolic representation; and performing one or more layout operations on the symbolic representation with at least the layout editing module to improve the layout and to generate a result set for the one or more layout operations, wherein the symbolic representation preserves layout design details yet presents a smaller subset of the layout design details of the layout circuit component in the layout.

19. The article of manufacture of claim 18, the set of acts further comprising:

identifying the layout circuit component into a functional group including a plurality of layout circuit components by examining the functional group to determine whether the functional group jointly performs a circuit function;

generating a first symbolic representation for the functional group based in part or in whole upon layout or electrical design data of the functional group, wherein the first symbolic representation includes a first schematic symbol of the functional group but not the schematic symbol of the layout circuit design component;

identifying m-factored layout circuit components; and generating one or more first bounding boxes for one or more first instances of a first layout circuit component in the m-factored layout circuit components by reproducing the one or more first bounding boxes with a first graphical or textual emphasis.

20. The article of manufacture of claim 18, the set of acts further comprising:

generating one or more second bounding boxes for one or more second instances of a second layout circuit component in m-factored layout circuit components by reproducing the one or more second bounding boxes with a second graphical or textual emphasis;

identifying a match pattern for the m-factored layout circuit components by identifying and comparing the first graphical or textual emphasis with the second graphical or textual emphasis;

generating a visual aid for the match pattern to a user with the first graphical or textual emphasis with the second graphical or textual emphasis;

generating one or more third bounding boxes for one or more third instances of a third layout circuit component in the m-factored layout circuit components by reproducing the one or more third bounding boxes with a third graphical or textual emphasis, wherein the one or more third instances comprise one or more dummy circuit components; and updating the symbolic representation by referencing the one or more first bounding boxes, the one or more second boxes, or the one or more third bounding boxes.

* * * * *